United States Patent
Liu et al.

(10) Patent No.: US 11,184,610 B2
(45) Date of Patent: Nov. 23, 2021

(54) INTRA-PREDICTION WITH MULTIPLE REFERENCE LINES

(71) Applicant: Futurewei Technologies, Inc., Plano, TX (US)

(72) Inventors: Shan Liu, San Jose, CA (US); Xiang Ma, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/913,227

(22) Filed: Jun. 26, 2020

(65) Prior Publication Data

US 2020/0329235 A1    Oct. 15, 2020

Related U.S. Application Data

(63) Continuation of application No. 15/972,870, filed on May 7, 2018, now Pat. No. 10,742,975.
(Continued)

(51) Int. Cl.
*H04N 19/11* (2014.01)
*H04N 19/139* (2014.01)
(Continued)

(52) U.S. Cl.
CPC ........... *H04N 19/11* (2014.11); *H04N 19/139* (2014.11); *H04N 19/61* (2014.11); *H04N 19/96* (2014.11);
(Continued)

(58) Field of Classification Search
CPC ........ H04N 19/11; H04N 19/96; H04N 19/61; H04N 19/139; H04N 19/593; H04N 19/82;
(Continued)

(56) References Cited

U.S. PATENT DOCUMENTS

2010/0027655 A1   2/2010   Matsuo et al.
2011/0280304 A1   11/2011  Jeon et al.
(Continued)

FOREIGN PATENT DOCUMENTS

CN   103200401 A   7/2013
CN   104871537 A   8/2015
(Continued)

OTHER PUBLICATIONS

Chen, J., et al., "Algorithm Description of Joint Exploration Test Model 3," Joint Video exploration Team (JVET), JVET-C1001_V3, Jul. 6, 2016, 37 pages.
(Continued)

*Primary Examiner* — Marnie A Matt
(74) *Attorney, Agent, or Firm* — Conley Rose, P.C.

(57) ABSTRACT

A video coding device receives a bitstream including video data. The device determines an intra-prediction mode subset. The intra-prediction mode subset include intra-prediction modes that correlate to a plurality of reference lines for a current image block and excludes intra-prediction modes that correlate to a primary reference line for the current image block. When a first intra-prediction mode is included in the intra-prediction mode subset, the device decodes the first intra-prediction mode by an alternative intra-prediction mode index. When the first intra-prediction mode is not included in the intra-prediction mode subset, the device decodes the first intra-prediction mode by an intra-prediction mode index. The device presents video data including an image block decoded based on the first intra-prediction mode.

18 Claims, 14 Drawing Sheets

Related U.S. Application Data

(60) Provisional application No. 62/511,757, filed on May 26, 2017, provisional application No. 62/503,884, filed on May 9, 2017.

(51) Int. Cl.
  *H04N 19/96* (2014.01)
  *H04N 19/61* (2014.01)
  *H04N 19/593* (2014.01)
  H04N 19/82 (2014.01)
  H04N 19/176 (2014.01)
  H04N 19/107 (2014.01)
  H04N 19/523 (2014.01)

(52) U.S. Cl.
  CPC .......... *H04N 19/107* (2014.11); *H04N 19/176* (2014.11); *H04N 19/523* (2014.11); *H04N 19/593* (2014.11); *H04N 19/82* (2014.11)

(58) Field of Classification Search
  CPC .. H04N 19/176; H04N 19/107; H04N 19/523; H04N 19/13; H04N 19/182; H04N 19/105; H04N 19/70
  USPC ...................................................... 375/240.12
  See application file for complete search history.

(56) References Cited

U.S. PATENT DOCUMENTS

| | | |
|---|---|---|
| 2011/0292994 A1 | 12/2011 | Lim et al. |
| 2012/0243606 A1 | 9/2012 | Lainema et al. |
| 2012/0314766 A1 | 12/2012 | Chien et al. |
| 2013/0301709 A1 | 11/2013 | Lim et al. |
| 2015/0350640 A1 | 12/2015 | Jeong et al. |
| 2017/0295366 A1 | 10/2017 | Chen et al. |
| 2017/0332073 A1 | 11/2017 | Lin et al. |
| 2017/0347103 A1* | 11/2017 | Yu ..................... H04N 19/1883 |
| 2017/0359595 A1 | 12/2017 | Zhang et al. |
| 2018/0098086 A1 | 4/2018 | Chuang et al. |
| 2018/0332284 A1* | 11/2018 | Liu ...................... H04N 19/139 |
| 2019/0141318 A1 | 5/2019 | Li et al. |
| 2019/0238839 A1 | 8/2019 | Ikeda |
| 2019/0306516 A1 | 10/2019 | Misra et al. |

FOREIGN PATENT DOCUMENTS

| | | | |
|---|---|---|---|
| EP | 2728883 | A2 | 5/2014 |
| EP | 2920964 | A1 | 9/2015 |
| EP | 2942954 | A2 | 11/2015 |
| WO | 2008102805 | A1 | 8/2008 |
| WO | 2014154094 | A1 | 10/2014 |
| WO | 2018070267 | A1 | 4/2018 |

OTHER PUBLICATIONS

"Series H: Audiovisual and Multimedia Systems, Infrastructure of audiovisual services—Coding of moving video, Advanced video coding for generic audiovisual services," ITU-T, H.264, Apr. 2017, 812 pages.
"Series H: Audiovisual and Multimedia Systems, Infrastructure of audiovisual services—Coding of moving video, High efficiency video coding," ITU-T, H.265, Dec. 2016, 664 pages.
Chang, Y., et al., "Arbitrary reference tier for intra directional modes," JVET-C0043r1, May 26-Jun. 1, 2016, 5 pages.
Li, J., et al., "Multiple line-based intra prediction," JVET-C0071, May 26-Jun. 1, 2016, 6 pages.
Chang, Y., et al., "EE6: Arbitrary References Tier for Intra Directional Modes, with Supplementary Results," JVET-D0099, Oct. 15-21, 2016, 6 pages.
Chang, Y., et al., "EE6: Arbitrary Reference Tier for Intra Directional Modes, with Supplementary Results," JVET-D0099r1, Oct. 15-21, 2016, 10 pages.
Chang, Y., et al., "EE6: Arbitrary Reference Tier for Intra Directional Modes, with Supplementary Results," JVET-D0099r2, Oct. 15-21, 2016, 7 pages.
Shang, Y., et al., "Suggested Software for Multiple Reference Tiers in EE6," JVET-D0131, Oct. 15-21, 2016, 3 pages.
Shang, Y., et al., "Suggested Software for Multiple Reference Tiers in EE6," JVET-D0131r1, Oct. 15-21, 2016, 4 pages.
Li, J., et al., "EE6: Multiple line-based intra prediction," JVET-D0149, Oct. 15-21, 2016, 5 pages.
Matsuo, S., et al., "Extension of Intra Prediction Using Multiple Reference Lines," ITU—Telecommunications Standardization Sector, Study Group 16, Question 6, Video Coding Experts Group (VCEG), No. VCEG-AF05, XP030003526, Apr. 19, 2007, 8 pages.
Matsuo, S., et al., "Intra prediction with spatial gradients and multiple reference lines," 2009 Picture Coding Symposium, IEEE, Jul. 21, 2009, 4 pages.
Li, J., et al., "Multiple line-based intra prediction," Joint Video Exploration Team (JVET) of ITU-T SG 16 WP 3 and ISO/EC JTC 1/SC 29/WG11, 3rd Meeting: Geneva, CH, May 26-Jun. 1, 2016, JVET-C0071 (version 2), 6 pages.
Matsuo, S., et al., "Extension of Intra Prediction Using Multiple Reference Lines.," 0ITU-Telecommunications Standardization Sector Study Group 16, Question 6 Video Coding Experts Group (VCEG) 32nd Meeting: San Jose, CA, USA, Apr. 20-21, 2007, VCEG-AF05, pp. 1-7.

* cited by examiner

INTRA-PREDICTION WITH MULTIPLE REFERENCE LINES

CROSS-REFERENCE TO RELATED APPLICATIONS

This patent application is a continuation of U.S. Nonprovisional patent application Ser. No. 15/972,870, filed May 7, 2018, by Shan Liu, et al., and titled "Intra-Prediction With Multiple Reference Lines," which claims the benefit of U.S. Provisional Patent Application No. 62/503,884, filed May 9, 2017, by Shan Liu, et al., and titled "Method and Apparatus For Intra Prediction Using Multiple Reference Lines," and U.S. Provisional Patent Application No. 62/511,757, filed May 26, 2017, by Xiang Ma, et al., and titled "Method and Apparatus For Intra Prediction Using Multiple Reference Lines," the teachings and disclosure of which are hereby incorporated in their entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a video coding device comprising: a receiver configured to receive a bitstream; a processor coupled to the receiver and configured to: determine an intra-prediction mode subset, the intra-prediction mode subset including intra-prediction modes that correlate to a plurality of reference lines for a current image block and excluding intra-prediction modes that correlate to a primary reference line for the current image block; when a first intra-prediction mode is included in the intra-prediction mode subset, decode the first intra-prediction mode by an alternative intra-prediction mode index; and when the first intra-prediction mode is not included in the intra-prediction mode subset, decode the first intra-prediction mode by an intra-prediction mode index; and a display coupled to the processor, the display to present video data including an image block decoded based on the first intra-prediction mode.

Optionally, in any of the preceding aspects, another implementation of the aspect provides, wherein the processor is further configured to: decode a reference line index when the first intra-prediction mode is included in the intra-prediction mode subset, the reference line index indicating a first reference line from the plurality of reference lines for the first intra-prediction mode; and decode no reference line index when the first intra-prediction mode is not included in the intra-prediction mode subset.

Optionally, in any of the preceding aspects, another implementation of the aspect provides, wherein the reference line index is positioned after the first intra-prediction mode in the bitstream.

Optionally, in any of the preceding aspects, another implementation of the aspect provides, wherein the intra-prediction mode subset includes a starting directional intra-prediction mode (DirS), an ending directional intra-prediction mode (DirE), and every Nth directional intra-prediction mode between DirS and DirE, where N is a predetermined integer value.

Optionally, in any of the preceding aspects, another implementation of the aspect provides, wherein the intra-prediction mode subset further includes planar prediction mode and Direct Current (DC) prediction mode.

Optionally, in any of the preceding aspects, another implementation of the aspect provides, wherein the intra-prediction mode subset includes a starting directional intra-prediction mode (DirS), an ending directional intra-prediction mode (DirE), a middle directional intra-prediction mode (DirD), a horizontal directional intra-prediction mode (DirH), a vertical directional intra-prediction mode (DirV), and valid directional intra-prediction modes at directions of plus or minus N of DirS, DirE, DirD, DirH, and DirV, where N is a predetermined integer value.

Optionally, in any of the preceding aspects, another implementation of the aspect provides, wherein the intra-prediction mode subset further includes planar prediction mode and Direct Current (DC) prediction mode.

Optionally, in any of the preceding aspects, another implementation of the aspect provides, wherein the intra-prediction mode subset includes intra-prediction modes selected for decoded neighbor blocks, the decoded neighbor blocks positioned at a predetermined adjacency to the current image block.

Optionally, in any of the preceding aspects, another implementation of the aspect provides, wherein the intra-prediction mode subset includes modes associated with a most probable mode (MPM) list for the current image block.

In an embodiment, the disclosure includes a method comprising: storing, in a memory, a bitstream including image blocks coded as prediction blocks; obtaining, by a processor coupled to the memory, a current prediction block encoded by a Direct Current (DC) intra-prediction mode; determining a DC prediction value to approximate a current image block corresponding to the current prediction block by determining an average of all reference samples in at least two of a plurality of reference lines associated with the current prediction block; reconstructing, by the processor, the current image block based on the DC prediction value; and displaying, on a display, a video frame including the current image block.

Optionally, in any of the preceding aspects, another implementation of the aspect provides, wherein determining the DC prediction value includes determining an average of all reference samples in N adjacent reference lines to the current prediction block, where N is a predetermined integer.

Optionally, in any of the preceding aspects, another implementation of the aspect provides, wherein determining the DC prediction value includes determining an average of all reference samples in a selected reference line and a corresponding reference line.

Optionally, in any of the preceding aspects, another implementation of the aspect provides, wherein determining the DC prediction value includes determining an average of all reference samples in an adjacent reference line and a selected reference line.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to: receive, via a receiver, a bitstream; decode, by the processor, an intra-prediction mode from the bitstream, the intra-prediction mode indicating a relationship between a current block and a selected reference line, the current block associated with a plurality of reference lines including the selected reference line; decode, by the processor, the selected reference line based on a selected code word indicating the selected reference line, the selected code word including a length based on a selection probability of the selected reference line; and present, on a display, video data including an image block decoded based on the intra-prediction mode and the selected reference line.

Optionally, in any of the preceding aspects, another implementation of the aspect provides, wherein the plurality of reference lines are indicated by a plurality of code words, and a reference line farthest from the current block is indicated by the code word with a second shortest length.

Optionally, in any of the preceding aspects, another implementation of the aspect provides, wherein the plurality of reference lines are indicated by a plurality of code words, and a reference line second farthest from the current block is indicated by the code word with a second shortest length.

Optionally, in any of the preceding aspects, another implementation of the aspect provides, wherein the plurality of reference lines are indicated by a plurality of code words, and a predefined reference line other than an adjacent reference line is indicated by the code word with a second shortest length.

Optionally, in any of the preceding aspects, another implementation of the aspect provides, wherein the plurality of reference lines are indicated by a plurality of code words, the plurality of code words sorted into a class A group and a class B group, the class A group including code words with shorter lengths than lengths of the code words in the class B group.

Optionally, in any of the preceding aspects, another implementation of the aspect provides, wherein the plurality of reference lines include reference rows and reference columns, and a number of reference rows stored for the current block is half a number of reference columns stored for the current block.

Optionally, in any of the preceding aspects, another implementation of the aspect provides, wherein the plurality of reference lines include reference rows and reference columns, and a number of reference rows stored for the current block is equal to a number of reference columns stored for the current block minus one.

Optionally, in any of the preceding aspects, another implementation of the aspect provides, wherein the plurality of reference lines include reference rows, and a number of reference rows stored for the current block is selected based on a number of reference rows employed by a deblocking filter operation.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
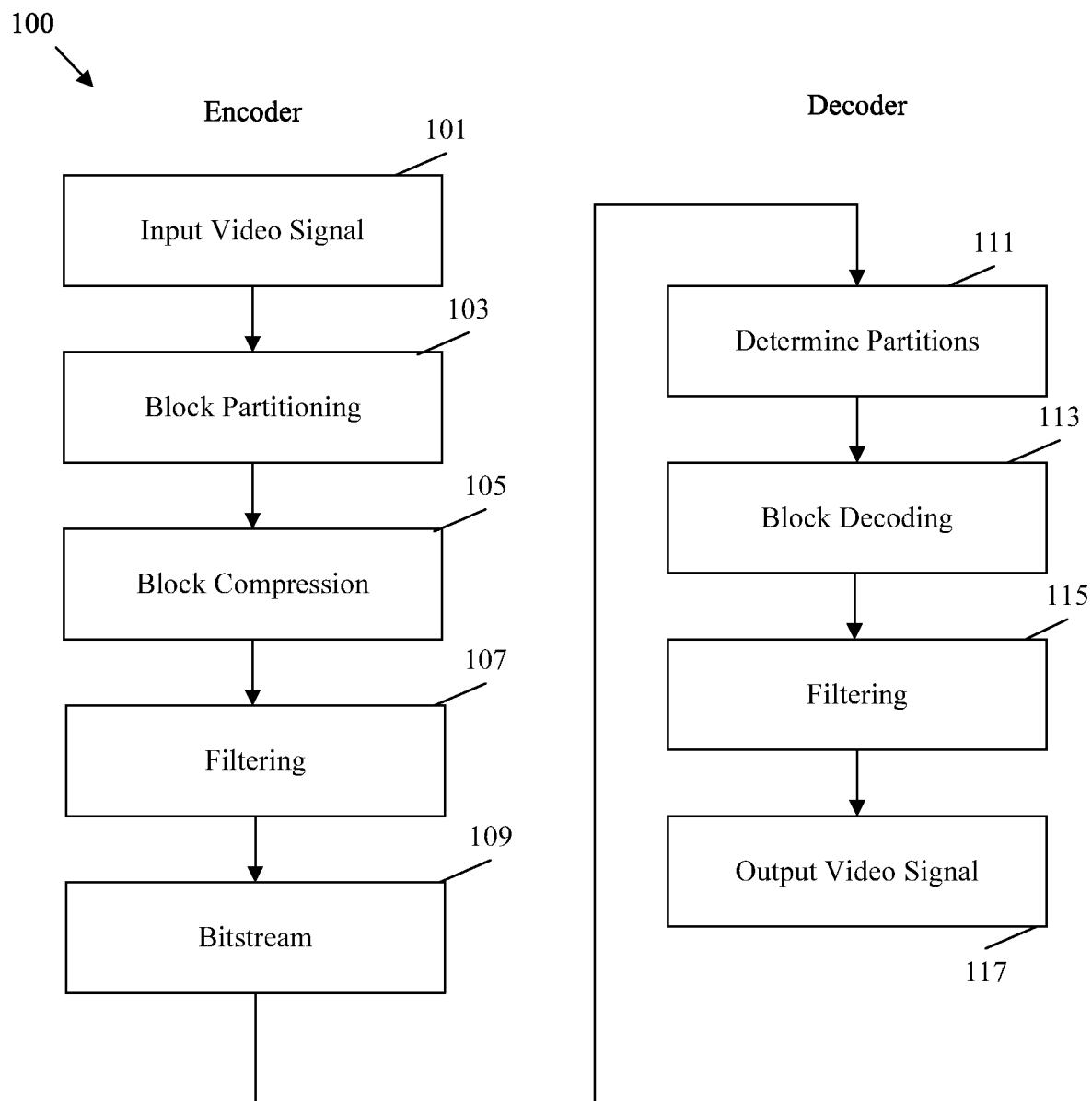
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame). In intra-prediction, a current image block is predicted from a reference line of samples. The reference line includes samples from adjacent image blocks, also called neighbor blocks. Samples from the current block are matched with samples from the reference line with the nearest luma (light) or chroma (color) values. The current block is coded as prediction modes that indicate the matching samples. The prediction modes include angular prediction modes, direct current (DC) mode, and planar mode. Differences between values predicted by the prediction modes and actual values are coded as residual values in a residual block. Matching may be improved by employing multiple reference lines. Improved matching results in reduced residual values and hence better compression. However, increasing the number of reference lines can increase the number of bins (binary values) needed to uniquely identify the matching reference lines. In cases where multiple reference lines are not needed to determine an optimal match, the increases in signaling overhead associated with identifying the multiple reference lines can overcome the compression gains generally associated with multiple reference lines and hence result in increasing the overall bitstream file size. This results in decreased coding efficiency in such cases.

Disclosed herein are mechanisms to support video coding processes that reduce signaling overhead related to intra-prediction based on multiple reference lines, and hence increase compression in video coding systems. For example, a mechanism for creating an intra-prediction mode subset is disclosed. Allowing all intra-prediction modes to have access to a complete set of multiple reference lines may result in increased signaling overhead, and hence large file sizes for the final encoding. Accordingly, the intra-prediction mode subset contains a subset of intra-prediction modes that have access to alternative reference lines, and modes that are excluded from the intra-prediction mode subset are limited to accessing a primary reference line. As used herein, the primary reference line is reference line positioned closest to the current block (e.g., immediately adjacent). Alternative reference lines include both the primary reference line as well as a set of reference lines that are positioned farther away from the current block than the primary reference line. The encoder may employ modes from the intra-prediction mode subset when alternative reference lines are beneficial and employ modes that are excluded from the intra-prediction mode subset when the primary reference line is sufficient. As modes outside of the intra-prediction mode subset are limited to accessing to the primary reference line, reference line indexes can be omitted for intra-prediction modes that are not included in the intra-prediction mode subset. This may be accomplished by encoding the reference line index after the intra-prediction mode information. When the intra-prediction mode information indicates the intra-prediction mode is not included in the intra-prediction mode subset, the decoder can be contextually aware that no reference line index is included. The intra-prediction modes included in the intra-prediction mode subset may be predetermined (e.g., stored in a table and/or hard coded) and/or contextually inferred based on neighbor block intra-prediction mode subsets, etc. In some cases, the intra-prediction mode subset can be selected to include modes associated with a most probable mode (MPM) list. This allows the most commonly selected mode to have access to alternative reference lines. Further, the intra-prediction modes in the intra-prediction mode subset can be signaled based on an intra-prediction mode subset index. As the intra-prediction mode subset contains fewer prediction modes than the full intra-prediction mode set, the intra-prediction mode subset index can generally be signaled with fewer bins. Further, disclosed is an extension to DC intra-prediction mode. The disclosed DC intra-prediction mode may allow a DC prediction value to be determined based on alternative reference lines. Also disclosed is a mechanism for condensing code word sizes that indicate particular reference lines. In this mechanism, the reference lines are indexed based on selection probability and not based on distance from a current image sample. For example, reference line indexes that are most likely to be selected receive the shortest index and reference lines that are the least likely to be selected receive the longest indexes. This results in smaller encodings for the reference line indexes in most cases. The code words for the reference line indexes may be determined in advance and employed consistently (e.g., stored in a table and/or hard coded.) Further, particular hardware designs require more memory to store reference line rows than reference line columns. Accordingly, a mechanism is disclosed to support storing fewer reference rows than reference columns when coding an image sample, and hence to support a reduction in memory requirements during coding.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence the table is described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a DC mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artefacts. Once the frames are filtered, the video signal can be output to a display at step 117 for viewing by an end user.

Figure 2:
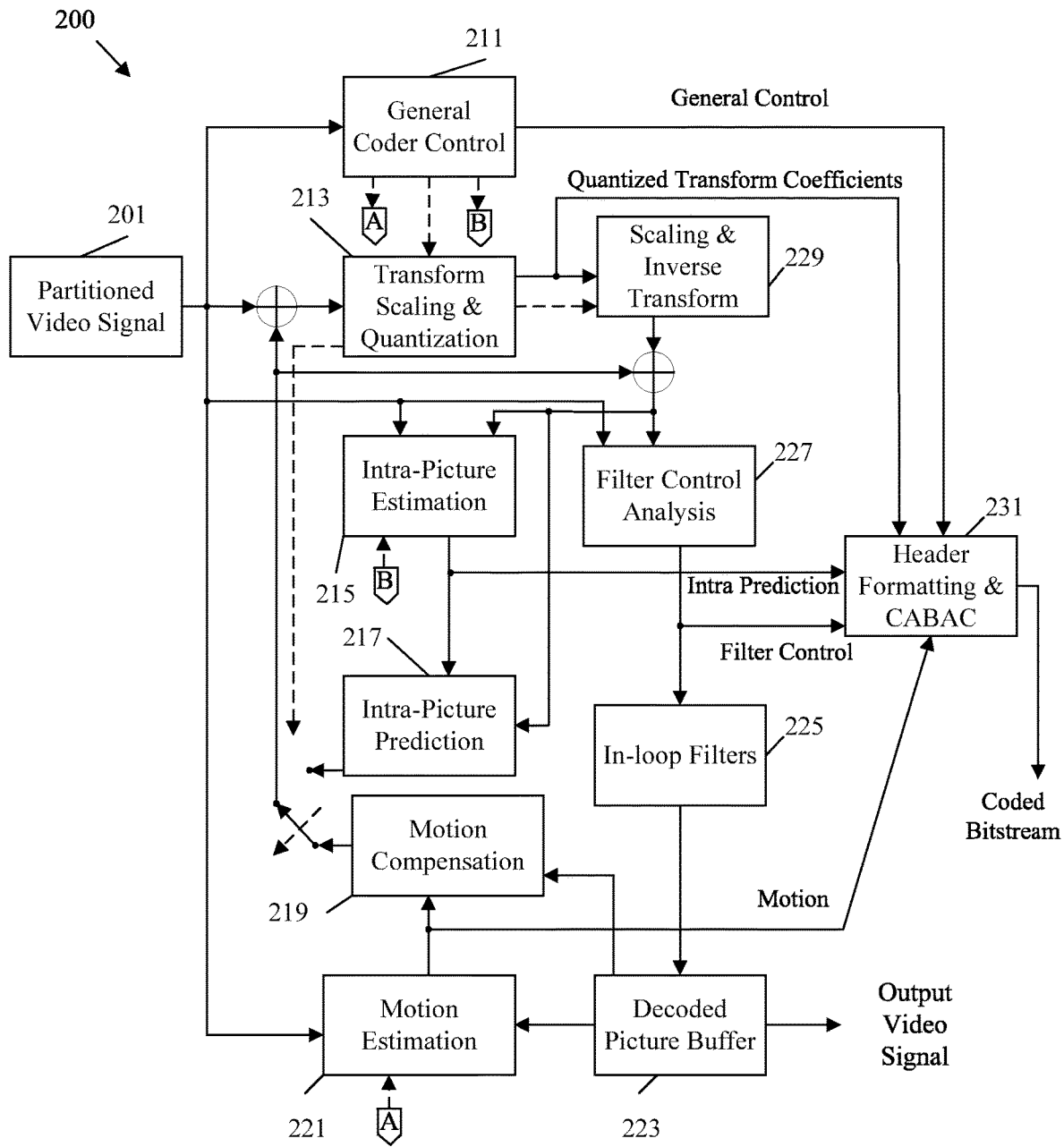
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original uncoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
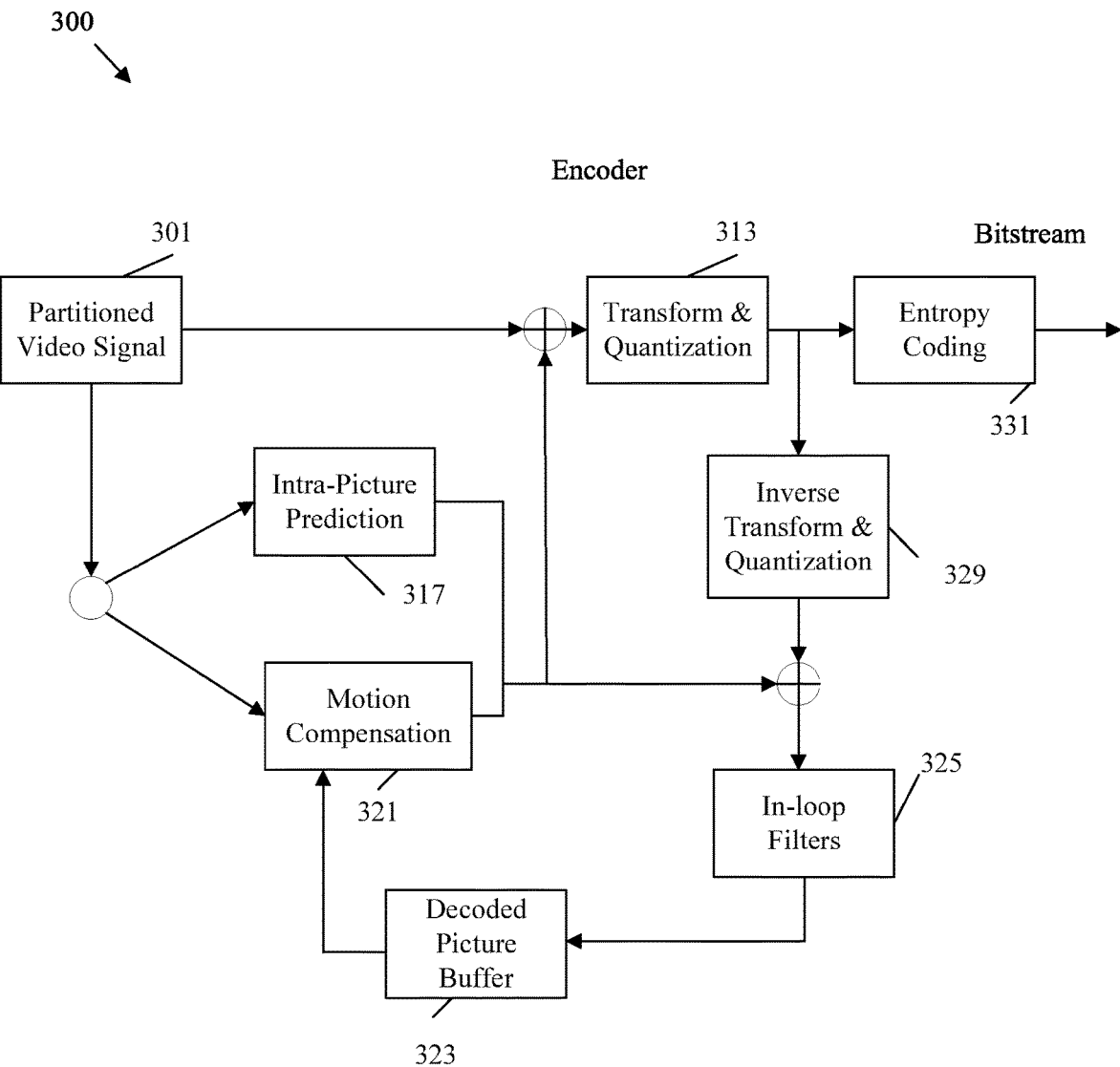
FIG. 3 is a block diagram illustrating an example video encoder that may implement intra-prediction.

FIG. 3 is a block diagram illustrating an example video encoder 300 that may that may implement intra-prediction. Video encoder 300 may be employed to implement the encoding functions of codec system 200 and/or implement steps 101, 103, 105, 107, and/or 109 of method 100. Video encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for inter-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, such as a noise suppression filter, a deblocking filter, a SAO filter, and/or an adaptive loop filter. The filtered blocks are then stored in a decoded picture buffer 323 for use in reference blocks by the motion compensation component 321. The decoded picture buffer 323 may be substantially similar to the decoded picture buffer 223.

As discussed below, the intra-picture prediction component 317 may perform intra-prediction by selecting intra-prediction modes with alternative reference lines associated with neighboring blocks. In order to reduce signaling overhead, intra-picture prediction component 317 may determine an intra-prediction mode subset that contains a subset of intra-prediction modes which have access to alternative reference lines. Modes that are excluded from the intra-prediction mode subset have access to a primary reference line. The intra-picture prediction component 317 then has the option of selecting an intra-prediction mode with alternative reference lines to obtain better matching or select an intra-prediction mode with a primary reference line to support lower signaling overhead. The intra-picture prediction component 317 may also employ various other mechanisms to support increased coding efficiency when employing alternative reference lines as discussed below.

Figure 4:
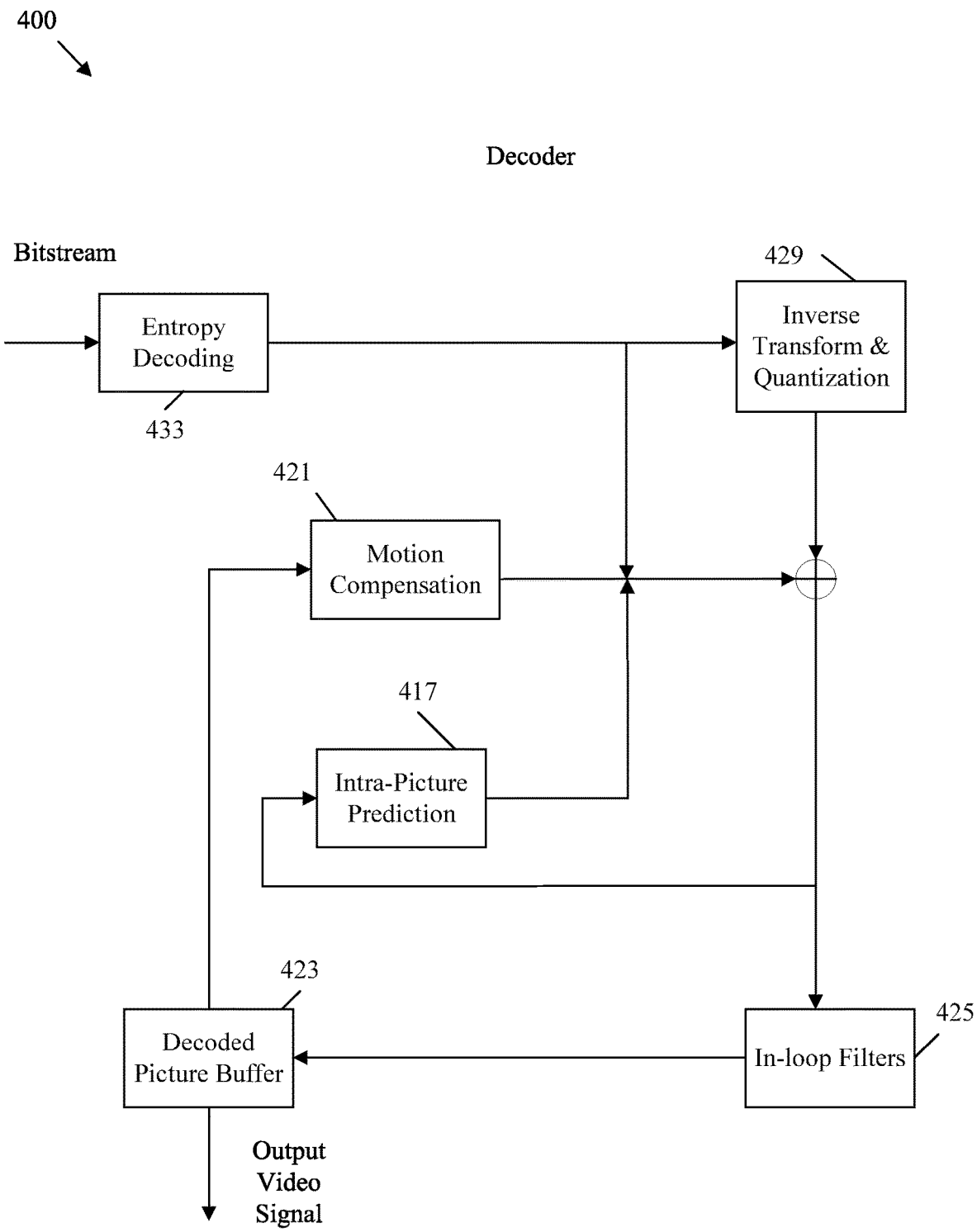
FIG. 4 is a block diagram illustrating an example video decoder that may implement intra-prediction.

FIG. 4 is a block diagram illustrating an example video decoder 400 that may implement intra-prediction. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 performs the reverse function of the entropy encoding component 331. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operates in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filter the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

As with intra-picture prediction component 317, intra-picture prediction component 417 may perform intra-prediction based on intra-prediction modes with alternative reference lines. Specifically, the intra-picture prediction component 417 is aware of the modes assigned to the intra-prediction mode subset. For example, the intra-prediction mode subset can correspond to a determined MPM list, can be predefined in memory, and/or be determined based on the intra-prediction mode of a neighboring block, depending on the example. As such, the intra-picture prediction component 417 can obtain a reference line index from the bitstream when the intra-prediction mode for the current block is in the intra-prediction mode subset. Otherwise, the intra-picture prediction component 417 can inferentially determine that a primary reference line is intended by the encoder. The intra-picture prediction component 417 may also employ various other mechanisms to support increased coding efficiency when employing alternative reference lines as discussed below.

Figure 5:
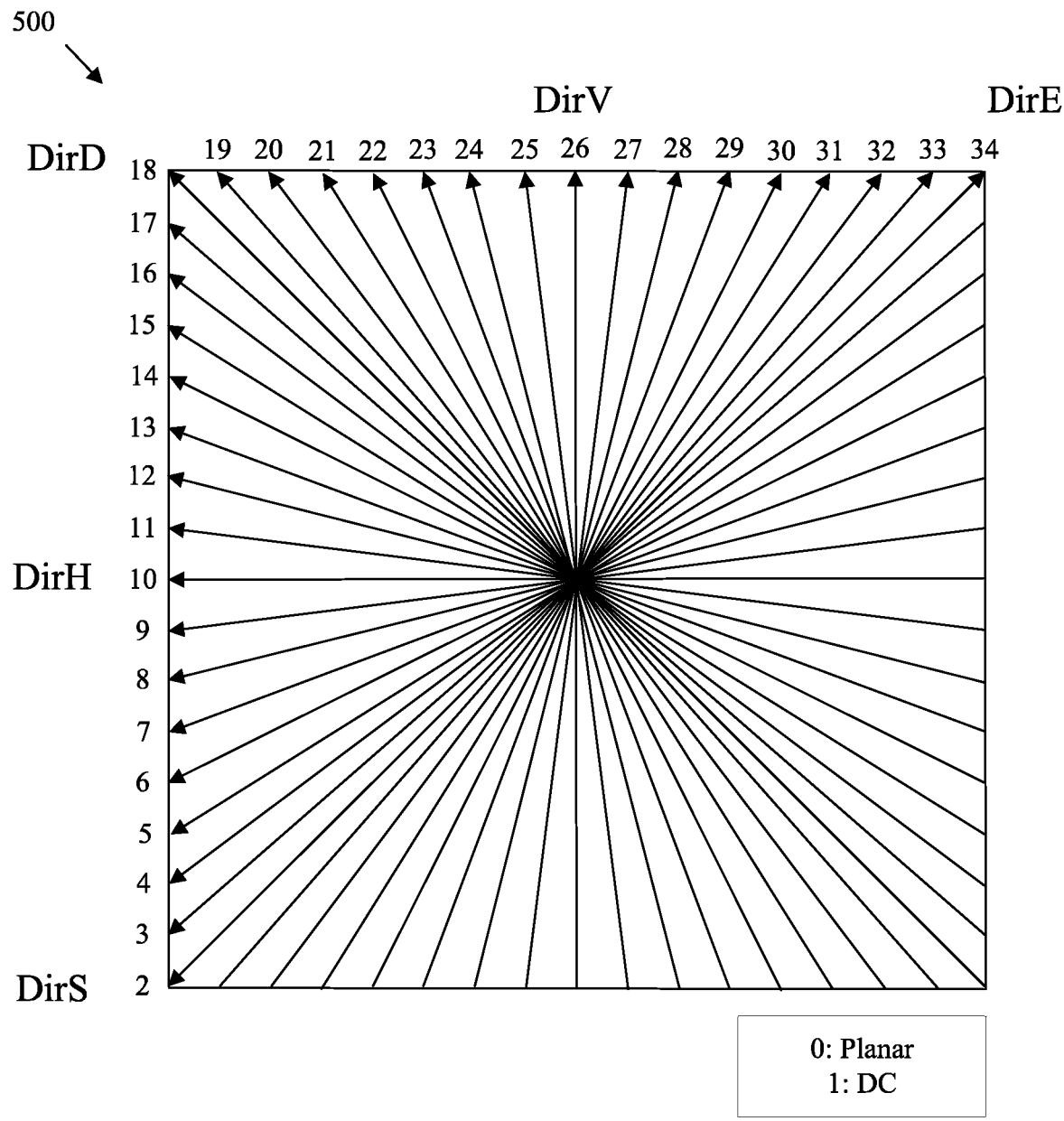
FIG. 5 is a schematic diagram illustrating example intra-prediction modes employed in video coding.

FIG. 5 is a schematic diagram illustrating example intra-prediction modes 500 employed in video coding. For example, intra-prediction modes 500 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. Specifically, intra-prediction modes 500 can be employed to compress an image block into a prediction block containing a selected prediction mode and a remaining residual block.

As noted above, intra-prediction involves matching a current image block to a corresponding sample or samples of one or more neighboring blocks. The current image block can then be represented as a selected prediction mode index and a residual block, which is much smaller than representing all of the luma/chroma values contained in the current image block. Intra-prediction can be used when there is no available reference frame, or when inter-predication coding is not used for the current block or frame. The reference samples for intra-prediction may be derived from previously coded (or reconstructed) neighboring blocks in the same frame. Advanced Video Coding (AVC), also known as H.264, and H.265/HEVC both employ a reference line of boundary samples of adjacent blocks as reference sample for intra-prediction. In order to cover different textures or structural characteristics many different intra-prediction modes are employed. H.265/HEVC supports a total of thirty five intra-prediction modes 500 that spatially correlate a current block to one or more reference samples. Specifically, intra-prediction modes 500 include thirty-three directional prediction modes indexed as modes two through thirty four, a DC mode indexed as mode one, and a planar mode indexed as mode zero.

During encoding, the encoder matches the luma/chroma values of a current block with the luma/chroma values of corresponding reference samples in a reference line across the edges of neighboring blocks. When the best match is found with one of the reference lines, the encoder selects one of the directional intra-prediction modes 500 that points to the best matching reference line. For clarity of discussion, acronyms are employed below to reference particular directional intra-prediction modes 500. DirS denotes the starting directional intra-prediction mode when counting clockwise from the bottom left (e.g., mode two in HEVC). DirE denotes the ending directional intra-prediction mode when counting clockwise from the bottom left (e.g., mode thirty four in HEVC). DirD denotes the middle directional intra coding mode when counting clockwise from the bottom left (e.g., mode eighteen in HEVC). DirH denotes a horizontal intra prediction mode (e.g., mode ten in HEVC). DirV denotes a vertical intra prediction mode (e.g., mode twenty six in HEVC).

As discussed above, DC mode acts as a smoothing function and derives a prediction value of a current block as an average value of all the reference samples in the reference line traversing the neighboring blocks. Also as discussed above, planar mode returns a prediction value that indicates a smooth transition (e.g., constant slope of values) between samples at the bottom and top left or top left and top right of the reference line of reference samples.

For Planar, DC, and prediction modes from DirH to DirV, the samples in both the top row of the reference line and the left column of the reference line are used as reference samples. For prediction modes with prediction directions from DirS to DirH (including DirS and DirH), the reference samples in the previously coded and reconstructed neighboring blocks on the left column of the reference line are used as reference samples. For prediction modes with prediction directions from DirV to DirE (including DirV and DirE), the reference samples of the previously coded and reconstructed neighboring blocks on the top row of the reference line are used as reference samples.

Though there are many intra-prediction modes 500, not all the intra-prediction modes 500 are selected with an equal probability during video coding. Further, the intra-prediction modes 500 selected by neighboring blocks statistically have a high correlation with intra-prediction modes 500 selected for a current block. Therefore, a MPM list may be employed in some examples. A MPM list is a list containing a subset of the intra-prediction modes 500 that are most likely to be selected. If an intra-prediction mode of a current block is included in the MPM list, the selected mode can be signaled in the bitstream by MPM list index, which may employ code words with fewer bins than the number of bins employed to uniquely identify all of intra-prediction modes 500.

The MPM list may be constructed with intra-prediction modes 500 of some neighbor decoded blocks and also some default intra-prediction modes with a high selected probability in general. For example, in H.265/HEVC the MPM list with length three is constructed with the intra-prediction modes of two neighbor blocks, one above and one left of current blocks. In case of duplicates, the modes of the MPM list are assigned by default as planar mode, DC mode, or DirV mode, in that order. The MPM list can also contain intra-prediction modes 500 of further neighbor blocks and/or further default intra-prediction modes 500, when the MPM list includes a longer length. The length of MPM list and the construction scheme may be predefined.

Figure 6:
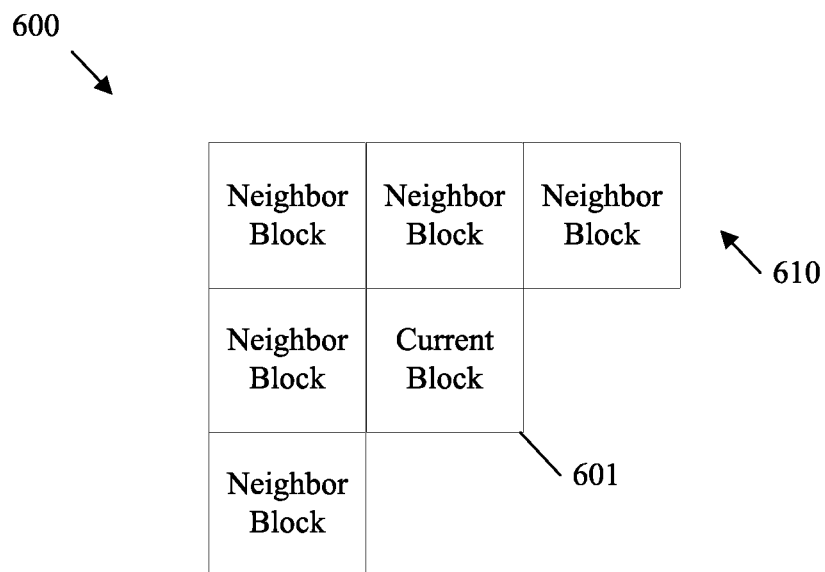
FIG. 6 is a schematic diagram illustrating an example of directional relationships of blocks in video coding.

FIG. 6 is a schematic diagram illustrating an example of directional relationships of blocks 600 in video coding. For example, the blocks 600 may be employed when selecting intra-prediction modes 500. Hence, blocks 600 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. In video coding, blocks 600 are partitioned based on video content and hence may include many rectangles and squares of varying shapes and sizes. Blocks 600 are depicted as squares for purposes of explanation and are hence simplified from actual video coding blocks to support clarity of discussion.

The blocks 600 contain a current block 601 and neighbor blocks 610. The current block 610 is any block being coded at a specified time. The neighbor blocks 610 are any blocks immediately adjacent to the left edge or top edge of the current block 601. Video coding generally proceeds from top left to bottom right. As such, the neighbor blocks 610 may be been encoded and reconstructed prior to coding of the current block 601. When coding the current block 601, the encoder matches the luma/chroma values of the current block 601 with a reference sample (or samples) from the a reference line traversing the edges of the neighboring blocks 610. The match is then employed to select an intra-prediction mode, for example from intra-prediction modes 500, that points to the matched sample (or samples when DC or planar mode are selected). The selected intra-prediction mode then indicates that the luma/chroma values of the current block 601 are substantially similar to the reference sample corresponding to selected intra-prediction mode. Any differences can be retained in a residual block. The selected intra-prediction mode is then encoded in a bitstream. At the decoder, the current block 601 can be reconstructed by employing the luma/chroma values of the reference samples in the selected reference line in the neighboring block 610 that corresponds to the selected intra-prediction mode (along with any residual information from the residual block).

Figure 7:
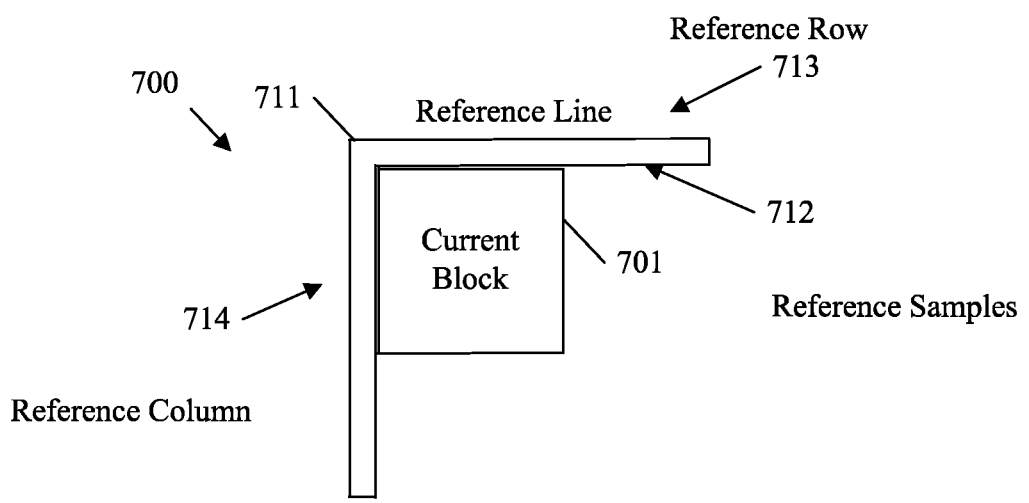
FIG. 7 is a schematic diagram illustrating an example of a primary reference line scheme for coding a block with intra-prediction.

FIG. 7 is a schematic diagram illustrating an example of a primary reference line scheme 700 for coding a block with intra-prediction. The primary reference line scheme 700 may be employed when selecting intra-prediction modes 500. Hence, the primary reference line scheme 700 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400.

The primary reference line scheme 700 employs a primary reference line 711 of reference samples 712. The primary reference line 711 includes edge samples (e.g., pixels) of neighboring blocks as reference samples 712 for a current block 701. A reference sample 712, as used herein, as a value, such as a chroma or a luma value, of a pixel or subportion thereof. The current block 701 is substantially similar to current block 601. For purposes of discussion, the primary reference line 711 contains a reference row 713 containing the reference samples 712 above the current block 701. The primary reference line 711 also contains a reference column 714 containing the reference samples 712 on the left side of the current block 701. In the primary reference line scheme 700, a primary reference line 711 is employed, where a primary reference line 711 is a reference line that is immediately adjacent to the current block 701. Hence, the current block 701 is matched as closely as possible with the reference samples 712 contained in the primary reference line 711 during intra-prediction.

Figure 8:
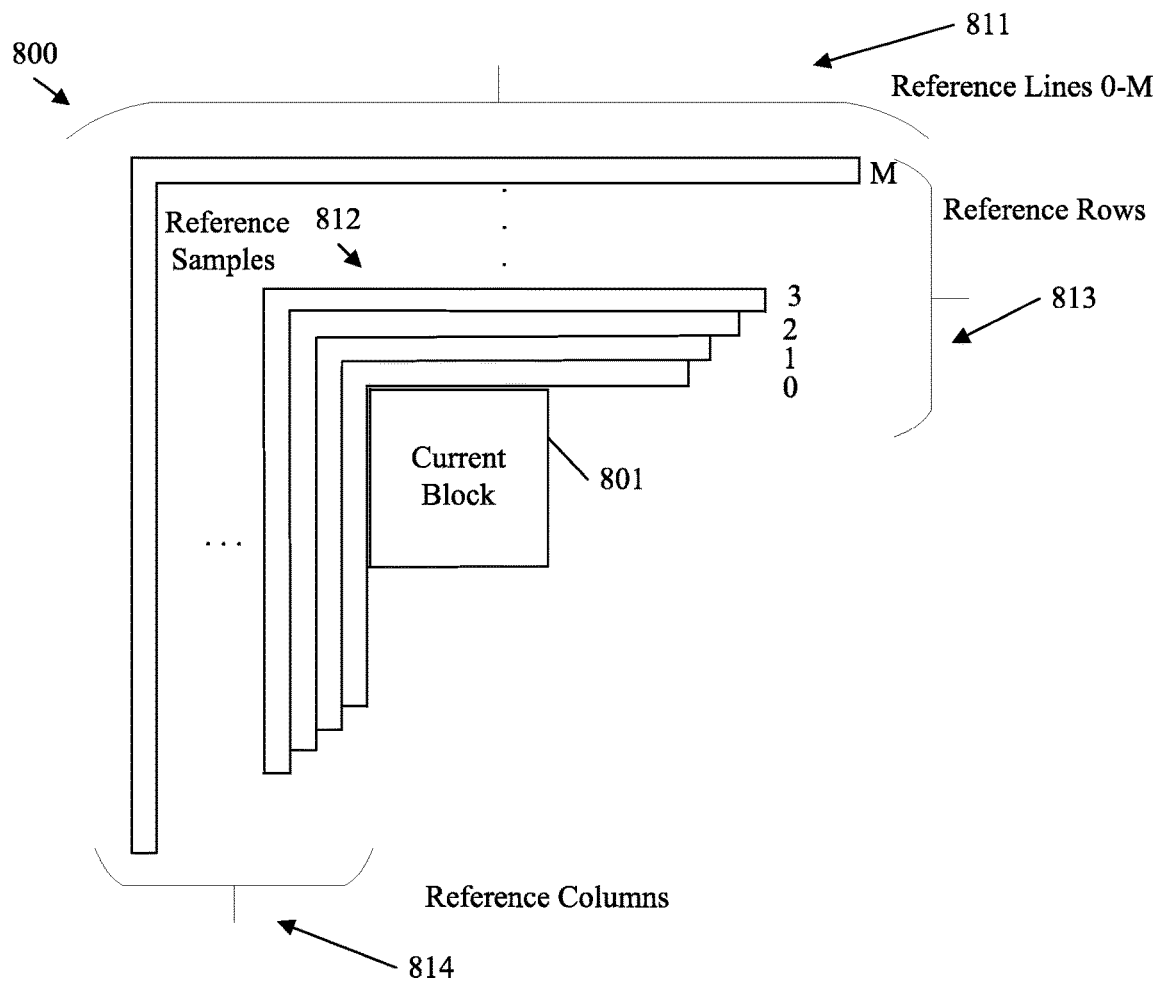
FIG. 8 is a schematic diagram illustrating an example of an alternative reference line scheme for coding a block with intra-prediction.

FIG. 8 is a schematic diagram illustrating an example of an alternative reference lines scheme 800 for coding a block with intra-prediction. The alternative reference lines scheme 800 may be employed when selecting intra-prediction modes 500. Hence, the alternative reference line scheme 800 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400.

The alternative reference line scheme 800 employs a current block 801, which is substantially similar to current block 701. A plurality of reference lines 811 extend from the current block 801. The reference lines 811 contain reference samples 812, which are similar to reference samples 712. Reference lines 811 are substantially similar to primary reference line 711, but extend farther away from the current block 801. Employing alternative reference lines 811 allows the matching algorithm to have access to more reference samples 812. The presence of more reference samples may result in a better match for the current bock 801 in some cases, which in turn may lead to fewer residual samples after the prediction mode is selected. Alternative reference line scheme 800 may be referred to as multiple lines intra prediction (MLIP), and is discussed in detail in Joint Video Experts Team (WET) documents JVET-C0043, JVET-O0071, JVET-D0099, JVET-D0131 and JVET-D0149, which are incorporated by reference. The reference lines 811 may be numbered from zero to M, where M is any predetermined constant value. The reference lines 811 may include reference rows 813 and reference columns 814 as shown, which are each similar to reference row 713 and reference column 714, respectively.

During encoding, the encoder can select the best match from the reference lines 811 based on RDO. Specifically, M+1 reference lines are employed from the nearest reference line (RefLine0) to farthest reference line (RefLineM), where M is greater than zero. The encoder selects the reference line with the best rate distortion cost. The index of the selected reference line is signaled to the decoder in the bitstream. Here, RefLine0 may be called the original reference line (e.g., primary reference line 711), and RefLine1~RefLineM can be referred to as further reference lines or alternative reference lines. Further reference lines can be selected for use by any of the intra-prediction modes 500. The further reference lines can also be selected for use by a subset of the intra-prediction modes 500 in some cases (e.g., DirS-DirE may use further reference lines).

Once a reference line 812 is selected, the index of the selected reference line from the reference lines 811 is signaled to the decoder in the bitstream. By employing different reference lines, a more accurate prediction signal can be derived, which may increase coding efficiency in some cases by reducing residual samples. However, employing alternative reference lines 811 increases signaling overhead as the selected reference line is signaled to the decoder. As the number of reference lines 811 used increases, more bins are employed during signaling to uniquely identify the selected reference line. As such, using alternative reference lines 811 may actually decrease coding efficiency when the matching sample is in the reference line immediately adjacent to the current block 801.

Despite the compression advantage assisted with MLIP, some areas can be improved to achieve higher coding gain. For example, an intra-prediction mode subset may be employed to achieve increased compression. Specifically, some intra-prediction modes may be selected to employ alternative reference lines 811 to support increased matching accuracy. Other intra-prediction modes may be selected to employ a primary reference line 711 and forgo the signaling overhead associated with employ alternative reference lines 811. The intra-prediction modes that employ alternative reference lines 811 may be included in an intra-prediction mode subset.

Figure 9:
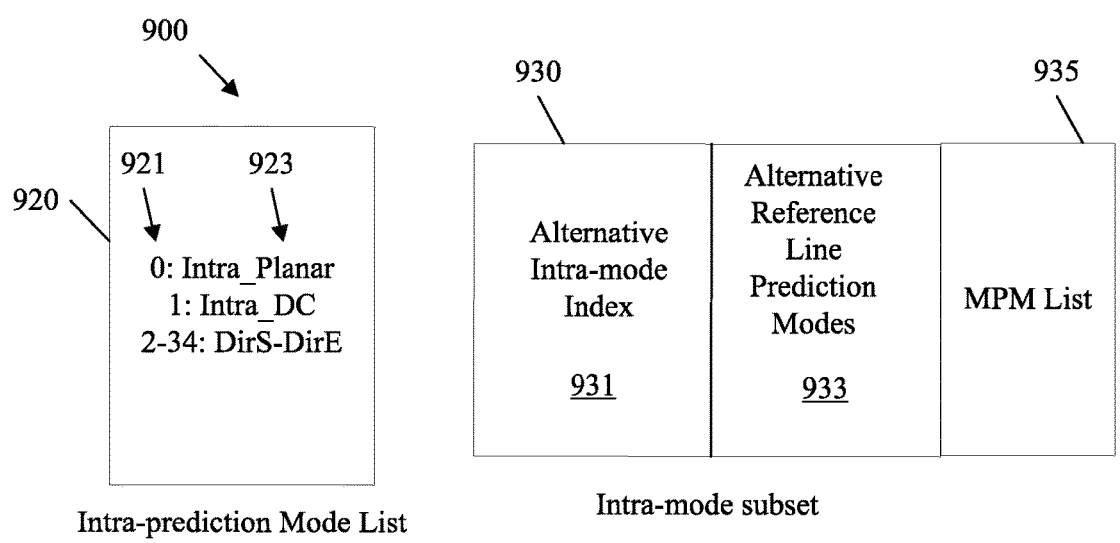
FIG. 9 is a schematic diagram illustrating an example intra-prediction mode subset.

FIG. 9 is a schematic diagram 900 illustrating an example intra-prediction mode subset 930, for use in video coding of intra-prediction modes at an encoder or a decoder. The alternative reference line scheme 800 and the primary reference line scheme 700 can be combined/modified to employ both an intra-prediction mode list 920 and the intra-prediction mode subset 930. The intra-prediction mode list 920 contains all of the intra-prediction modes 923 (e.g., intra-prediction modes 500) that can be employed in an intra-prediction scheme. Such intra-prediction modes 923 may each be indexed by a corresponding intra-prediction mode index 921. In this example, some of the intra-prediction modes have access to alternative reference lines. The intra-prediction modes that have access to alternative reference lines are stored in the intra-prediction mode subset 930 as alternative reference line prediction modes 933. The alternative reference line prediction modes 933 in the intra-prediction mode subset 930 can be indexed by an alternative intra-prediction mode index 931. The alternative intra-prediction mode index 931 is an index value used to number and indicate the alternative reference line prediction modes 933 in the intra-prediction mode subset 930. As fewer intra-prediction modes are included in the intra-prediction mode subset 930, the alternative intra-prediction mode index 931 may contain fewer bins than the intra-prediction mode index 921. Accordingly, when an intra-prediction mode is included in the intra-prediction mode subset 930, the intra-prediction mode can be matched to alternative reference lines. When an intra-prediction mode is not included in the intra-prediction mode subset 930, the intra-prediction mode can be matched to a primary reference line. This scheme takes advantage of the fact that the intra-prediction mode list 920 contains many intra-prediction modes 923 to cover texture and structural character in fine detail. However, the probability of employing alternative reference lines is relatively low. As such, rough directions are enough in an alternative reference line case. Therefore, the intra-prediction modes 923 can be sampled to construct the intra-prediction mode subset 930 by employing schemes as discussed below.

The use of both the intra-prediction mode list 920 and the intra-prediction mode subset 930 allows for significant increases in coding efficiency. Further, the selection of which intra-prediction modes should be included as alternative reference line prediction modes 933 affects the coding efficiency. For example, a large mode range employs more bits to represent the alternative intra-prediction mode index 931, while fewer bits are employed when the mode range is smaller. In one embodiment, the intra-prediction mode subset 930 contains each second intra-prediction mode in [DirS, DirE], where [A, B] indicates a set containing integer element x, and B≥x≥A. Specifically, the intra-prediction mode subset 930 may be associated with prediction modes {DirS, DirS+2, DirS+4, DirS+6, . . . , DirE}, where {A,B, C,D} indicates a set containing all elements listed between the braces. Further, the number of bits to represent a selected intra-prediction mode in the alternative intra-prediction mode index 931 mode range is reduced. In such a case, the alternative intra-prediction mode index 931 can be derived by the intra-prediction mode index 921 divided by two.

In another embodiment, the intra-prediction mode subset 930 contains the intra-prediction modes in an MPM list 935. As noted above, an MPM list 935 contains a subset of the intra-prediction modes that are most likely to be selected. In this case, the intra-prediction mode subset 930 may be configured to contain the intra-prediction modes of the decoded and/or reconstructed neighbor blocks of the current block. A flag may be employed in the bitstream to indicate whether a selected intra-prediction mode is included in the MPM list 935. When the selected intra-prediction mode is in the MPM list 935, an MPM list 935 index is signaled. Otherwise, the alternative intra-prediction mode index 931 is signaled. When the selected intra-prediction mode is a primary reference line mode, and not included in the MPM list 935, the intra-prediction mode index 921 can be signaled. In some examples, a binarization mechanism can be employed in which the alternative intra-prediction mode index 931 and/or MPM list 935 index are fixed-length. In some examples, the alternative intra-prediction mode index 931and/or MPM list 935 index are coded via context-based adaptive binary arithmetic coding (CABAC). Other binarization and/or entropy coding mechanisms may also be employed. The binarization/entropy coding mechanism employed is predefined. The mode range of the intra-prediction mode subset 930 contains fewer intra-prediction modes (e.g., rough modes) than the intra-prediction mode list 920. Accordingly, when an intra-prediction mode in the MPM list 935 (e.g., the mode of a neighbor block) is not included in the intra-prediction mode subset 930 mode range, the intra-prediction mode index 921 can be divided (e.g., by two) rounded to a nearest alternative intra-prediction mode index 931 value, for example by adding or subtracting one. The rounding mechanism may be predefined. The relative position of the neighbor blocks, the scanning order, and/or the size of the MPM list 935 may also be predefined.

As a specific example, an encoder operating according to H.265 may employ a mode range of [DirS, DirE] with a size of thirty three. When each second mode is employed in the intra-prediction mode subset 930, the size of mode range for the alternative intra-prediction mode index 931 is seventeen. The size of the MPM list 935 may be one, and the intra-prediction mode of the top neighbor decoded block is used to construct the MPM list 935. When the mode of the neighbor block is not in the mode range of the alternative intra-prediction mode index 931 (e.g., mode three), the mode of the neighbor block is rounded to mode four (or two). As a particular example, when the selected intra-prediction mode is mode sixteen, according to the intra-prediction mode index 921, and when the selected mode is not in the MPM list 935, the selected intra-prediction mode would have an alternative intra-prediction mode index 931 of eight (16/2=8). When a fixed-length binarization method is employed, 1000 could be employed to indicate the selected intra-prediction mode in this example.

The examples/embodiments above presume that the intra-prediction mode subset 930 includes each odd (or each even) of the intra-prediction modes 923. However, other mechanisms can also be employed to populate the intra-prediction mode subset 930 while employing the mechanisms described above. In one example, the intra-prediction mode subset 930 includes each Nth intra-prediction mode in [DirS, DirE], where N is an integer equal to 0, 1, 2, 3, 4, etc. This example can also be described as {DirS, DirS+N, DirS+2N . . . DirE}. As another example, the intra-prediction mode subset 930 may contain each Nth intra-prediction mode in [DirS, DirE] as well as Planar and DC intra-prediction modes.

In another example, the intra-prediction mode subset 930 contains intra-prediction modes with high general selection probability. Then the intra-prediction mode signaling cost is hence reduced, and the coding efficiency is improved. In some examples, the intra-prediction modes with primary directions are selected with a higher general probability in general (e.g., directly vertical, horizontal, etc.). Accordingly, the intra-prediction mode subset 930 may include such modes. For example, intra-prediction mode subset 930 can include primary directional intra-prediction modes, such as DirS, DirE, DirD, DirV and DirH. Neighbor modes to the primary modes may also be included in some examples. As a specific example, intra-prediction modes DirS, DirE, DirD, DirV, DirH, are included in the intra-prediction mode subset 930 along with adjacent intra-prediction modes with an index of plus or minus N. This may be expressed as [DirS, DirS+N], [DirE−N, DirE], [DirD−N, DirD+N], [DirH−N, DirH+N], [DirV−N, DirV+N]. In another example, the intra-prediction mode subset 930 includes intra-prediction modes DirS, DirE, DirD, DirV, DirH, as well as adjacent intra-prediction modes with an index of plus or minus N and DC and Planar mode.

In another example, the intra-prediction mode subset 930 constructed adaptively, and hence not defined with pre-defined intra-prediction modes. For example, the intra-prediction mode subset 930 may contain intra-prediction modes of neighbor decoded blocks (e.g., neighbor blocks 610) of the current block (e.g., current block 601). Neighbor blocks may be positioned to the left and above the current block. Additional neighbor blocks may also be employed. The size and the construction scheme of the intra-prediction mode subset 930 is predefined. In another example, the intra-prediction mode subset 930 contains the intra-prediction modes of neighbor blocks plus certain predetermined default intra-prediction modes, such as DC and Planar modes. In another example, the intra-prediction mode subset 930 contains the intra-prediction modes in the MPM list 935.

Upon receiving a reference line index in a bitstream, a decoder determines that the intra-prediction mode list 920 is implicated when the reference line index points to a primary reference line. In such a case, the decoder can read a following intra-prediction mode index 921 to determine the corresponding intra-prediction modes 923. When the reference line index points to an additional reference line, then the intra-mode subset 930 is implicated. In such a case, the decoder can read a following alternative intra-prediction mode index 931 to determine the corresponding alternative reference line prediction mode 933. In some examples, a flag may be employed to indicate when the indicated alternative reference line prediction mode 933 is in the MPM list 935. In such a case, the alternative reference line prediction mode 933 may be signaled according to an index employed by the MPM list 935.

As noted above, diagram 900 can be employed when coding an intra-prediction mode with alternative reference lines or with a primary reference line. Discussed below are signaling schemes to code such data. Specifically, a reference line index can be signaled after the index for the corresponding intra-prediction mode. Further, the reference line index can be conditionally signaled. For example, the reference line index can be signaled when the intra-prediction mode is associated with alternative reference lines or omitted when the intra-prediction mode is related to a primary reference line. This allows the reference line index to be omitted whenever the intra-prediction mode is not included in the intra-prediction mode subset 930, as there is no need to indicate a reference line index in a primary reference line case. This approach significantly increases coding efficiency by reducing signaling overhead. The conditional signaling schemes discussed below are an example implementation of this concept.

Figure 10:
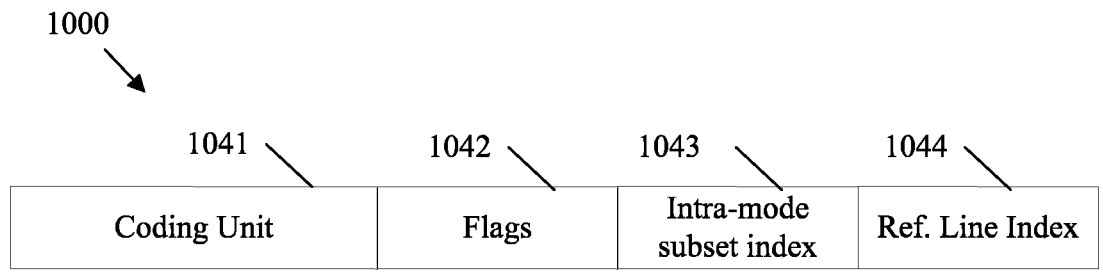
FIG. 10 is a schematic diagram illustrating an example conditional signaling representation for alternative reference lines in a video coding bitstream.

FIG. 10 is a schematic diagram illustrating an example conditional signaling representation 1000 for alternative reference lines in a video coding bitstream. For example, conditional signaling representation 1000 may be employed in a bitstream when an intra-prediction mode subset 930 is employed as part of an alternative reference line scheme 800 during video coding employing intra-prediction modes such as intra-prediction modes 500 at an encoder or a decoder. Specifically, when a coding device encodes or decodes a bitstream with intra-prediction data including a selected intra-prediction mode associated with alternative reference lines, conditional signaling representation 1000 is used. Alternatively, when a coding device encodes or decodes a bitstream with intra-prediction data including a selected intra-prediction mode associated with a primary reference line, a conditional signaling representation 1100 is used instead, as discussed below.

Conditional signaling representation 1000 may include a coding unit 1041 field that includes relevant partitioning information. Such partitioning information indicates block boundaries to the decoder to allow the decoder to fill the decoded image blocks to create a frame. The coding unit 1041 field is included for context and may or may not be located adjacent to the other fields discussed with respect to conditional signaling representation 1000. Conditional signaling representation 1000 further includes flags 1042. Flags 1042 indicate to the decoder that the information that follows is for an intra-prediction mode associated with alternative reference lines. For example, flags 1042 may indicate whether the following information is coded as an alternative intra-prediction mode index 931 or an MPM list 935 index. Following the flags 1042, an intra-prediction mode subset index 1043 field is employed, for example to code an alternative intra-prediction mode index 931. In some examples, the intra-prediction mode subset index 1043 field would be substituted for a MPM list index field to hold an MPM list 935 index as discussed above. In either case, the decoder is capable of deciphering the selected intra-prediction mode for the relevant coding unit 1041 based on the flags 1042 and the index. As the intra-prediction mode subset index 1043 field has indicated that the selected intra-prediction mode is related to alternative reference lines, a reference line index 1044 is also included to indicate to the decoder which reference line contains the matching sample. Accordingly, the intra-prediction mode subset index 1043 provides the direction of the matching sample in a neighboring block and the reference line index 1044 provides the distance to the matching sample. Based on this information, the decoder can determine the matching sample, employ the matching sample to generate a prediction block, and optionally combine the prediction block with a residual block coded elsewhere in the bitstream to reconstruct a block of pixels.

Figure 11:
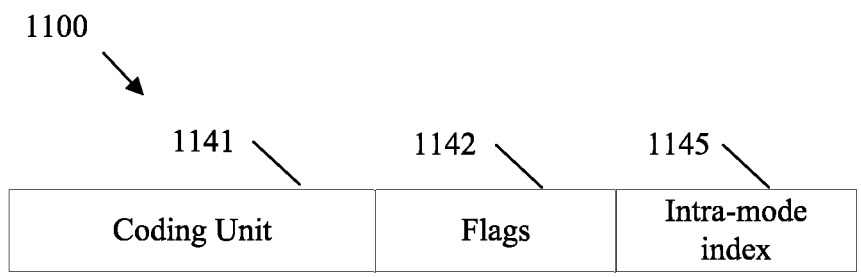
FIG. 11 is a schematic diagram illustrating an example conditional signaling representation for a primary reference line in a video coding bitstream.

FIG. 11 is a schematic diagram illustrating an example conditional signaling representation 1100 for a primary reference line in a video coding bitstream. For example, conditional signaling representation 1100 may be employed in a bitstream when an intra-prediction mode list 920 is employed as part of a primary reference line scheme 700 during video coding employing intra-prediction modes such as intra-prediction modes 500 at an encoder or a decoder. The conditional signaling representation 1100 may include a coding unit 1141 field with partition information in a manner similar to coding unit 1041 field. The conditional signaling representation 1100 also include flags 1142, which are substantially similar to flags 1042, but in this case indicate the selected intra-prediction mode is not associated with an intra-prediction mode subset 930. Based on the information in flags 1142, intra-prediction mode index 1145 can then be interpreted as an index in the mode range for an intra-prediction mode index 921. Further, as the selected intra-prediction mode is determined to be associated with a primary reference line, the reference line index is omitted.

Accordingly, conditional signaling representation 1000 and conditional signaling representation 1100 can be employed to signal either an intra-prediction mode with alternative reference lines or an intra-prediction mode with a primary reference line, respectively. These schemes may be employed with any of the examples/embodiments discussed above. In one example, intra-prediction modes in [DirS, DirE] can employ alternative reference lines. In such a case, when the selected intra-prediction mode is not included in [DirS, DirE] (e.g., DC or planar mode), there is no need to signal the reference line index. Hence, the reference index is inferred to be equal to zero, where zero indicates a primary reference line immediately adjacent to the current block. In such a case, the intra-prediction mode subset 930 may not be employed as all directional references employ alternative reference lines in such a case. In summary, the reference line index is signaled in such an example whenever the intra-prediction mode is not DC or planar mode. Further, the reference line index is not signaled whenever the intra-prediction mode is DC or planar mode in such a case. In another example, the reference line index is signaled whenever the intra-prediction mode is in an intra-prediction mode subset 930. Accordingly, the reference line index is not signaled whenever the intra-prediction mode is not included in an intra-prediction mode subset 930.

Table 1 below is an example syntax table describing the case where the reference index is omitted when the selected mode is DC or planar mode:

TABLE 1

| coding_unit( x0, y0, log2CbSize ) { | Descriptor |
|---|---|
| ... | |
| ... | |
| pbOffset = ( PartMode = = PART_NxN ) ? ( nCbS / 2 ) : nCbS | |
| for( j = 0; j < nCbS; j = j + pbOffset ) | |
|   for( i = 0; i < nCbS; i = i + pbOffset ) | |
|     prev_intra_luma_pred_flag[ x0 + i ][ y0 + j ] | ae(v) |
| for( j = 0; j < nCbS; j = j + pbOffset ) | |
|   for( i = 0; i < nCbS; i = i + pbOffset ) | |
|     if( prev_intra_luma_pred_flag[ x0 + i ][ y0 + j ]) | |
|       mpm_idx[ x0 + i ][ y0 + j ] | ae(v) |
|     else | |
|       rem_intra_luma_pred_mode[ x0 + i ][ y0 + j ] | ae(v) |
|       ... | ae(v) |
|     ... | |
|     if( IntraMode != DC && IntraMode != Planar) | |
|       reference_line_idx[ x0 ][ y0 ] | ae(v) |
| ... | |
| ... | |
| } | |

As shown in Table 1 above, if the intra-prediction mode is not planar and not DC, then the reference line index is signaled, in this example along with the x and y position of the current block.

Table 2 below is an example syntax table describing the case where the reference index is signaled when the current intra-prediction mode is included in an intra-prediction mode subset and otherwise omitted. The intra-prediction mode subset may be determined according to any of the mechanisms discussed with respect to FIG. 9.

TABLE 2

```
coding_unit( x0, y0, log2CbSize ) {                              Descriptor
    ...
    ...
    pbOffset = ( PartMode = = PART_NxN ) ? ( nCbS / 2 ) : nCbS
    for( j = 0; j < nCbS; j = j + pbOffset )
        for( i = 0; i < nCbS; i = i + pbOffset )
            prev_intra_luma_pred_flag[ x0 + i ][ y0 + j ]        ae(v)
    for( j = 0; j < nCbS; j = j + pbOffset )
        for( i = 0; i < nCbS; i = i + pbOffset )
            if( prev_intra_luma_pred_flag[ x0 + i ][ y0 + j ])
                mpm_idx[ x0 + i ][ y0 + j ]                      ae(v)
            else
                rem_intra_luma_pred_mode[ x0 + i ][ y0 + j ]     ae(v)
                ...                                              ae(v)
            ...
            if( /* IntraMode is in SubSet */)
                reference_line_idx[ x0 ][ y0 ]                   ae(v)
            ...
            ...
}
```

As shown in Table 2 above, if the intra-prediction mode is in the intra-prediction subset, then the reference line index is signaled.

Additional modifications can also be made to a MLIP scheme, independently or in combination with the examples/embodiments discussed above. For example, in many MLIP schemes DC intra-prediction mode is limited to a primary reference line. In such a case, the DC intra-prediction mode generates a prediction value that is an average of all reference samples in the reference line. This creates a smoothing effect between blocks. As discussed below, the DC intra-prediction mode can be extended in a MLIP scheme to generate a prediction value that is an average of all reference samples in a plurality of reference lines.

Figure 12:
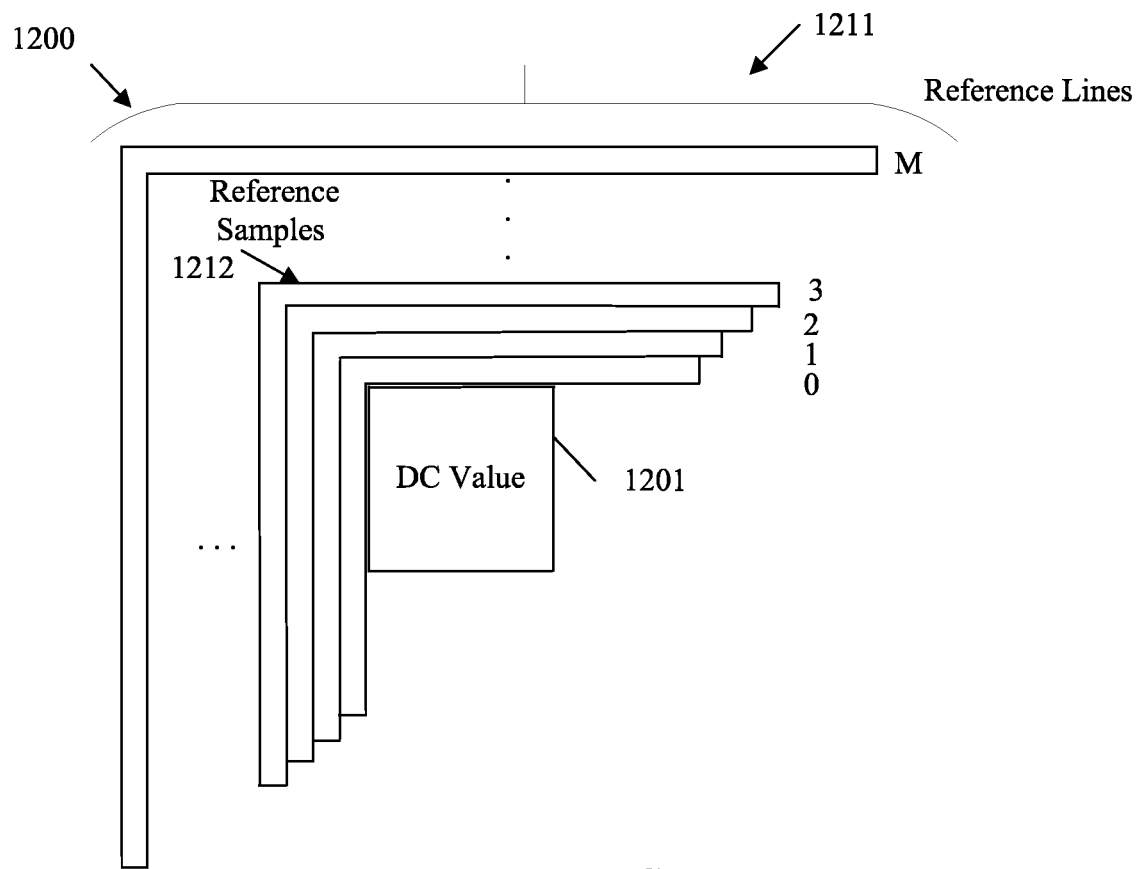
FIG. 12 is a schematic diagram illustrating an example mechanism for DC mode intra-prediction with alternative reference lines.

FIG. 12 is a schematic diagram illustrating an example mechanism for DC mode intra-prediction 1200 with alternative reference lines 1211. The DC mode intra-prediction 1200 can be employed at an encoder or a decoder, such as encoder 300 or decoder 400, when performing DC intra-prediction, for example according to intra-prediction modes 500. The DC mode intra-prediction 1200 scheme can be employed in conjunction with an intra-prediction mode subset 930, conditional signaling representations 1000 and 1100, or can be employed independently of such examples.

The DC mode intra-prediction 1200 employs a current block with alternative reference lines 1211 denoted as 0-M. As such, any number of reference lines 1211 may be employed. Such reference lines 1211 are substantially similar to reference lines 811 and contain reference samples 1212 that are substantially similar to reference samples 812. A DC prediction value 1201 is then calculated as an average of reference samples 1212 in a plurality of the reference lines 1211. In one example, the DC prediction value 1201 is calculated as an average of all reference samples 1212 in all reference lines 1211 0-M regardless of which of the reference lines 1211 is selected during intra-prediction mode selection. This provides a very robust DC prediction value 1201 for the current block. For example, if there are four reference lines 1211, the average value of all the reference samples 1212 in reference lines 1211 indexed as zero through three is determined and set as the DC prediction value 1201 of the current block. In such an example, the reference line index may not be signaled in the bitstream in some cases.

In another example, the DC prediction value 1201 is determined based on a selected reference line and a corresponding reference line. This allows the DC prediction value 1201 to be determined based on two correlated reference lines 1211 instead of all or only the reference line of index zero. For example, when four reference lines 1211 are employed, the reference lines 1211 may be indexed as zero through four. In such a case, Table 3 below indicates an example of corresponding reference lines 1211 that are employed when a reference line is selected.

TABLE 3

| Selected RefLine Index | Corresponding RefLine Index |
|---|---|
| 0 | 1 |
| 1 | 2 |
| 2 | 3 |
| 3 | 0 |

As shown, correlated reference lines 1211 can be employed to determine a DC prediction value 1201. In such a case, the decoder may determine both reference lines 1211 when the selected reference line index is signaled in the bitstream.

In another example, the DC mode intra-prediction 1200 may always employ the reference line of index zero (the primary reference line) and may also select further reference lines 1211 when such selection would more accurately match the DC prediction value 1201 to the values of the predicted pixel block. Table 4 below depicts such an example. In such a case, the decoder may determine both reference lines 1211 when the selected reference line index is signaled in the bitstream.

TABLE 4

| Selected RefLine Index | Default RefLine Index |
|---|---|
| 0 | — |
| 1 | 0 |
| 2 | 0 |
| 3 | 0 |

Additional modifications can also be made to a MLIP scheme, independently or in combination with the examples/embodiments discussed above. For example, in many MLIP schemes reference lines are indexed based on a distance of the reference line from the current block. For example in NET-00071, code words 0, 10, 110, and 111 are employed to indicate RefLine0, RefLine1, RefLine2, and RefLine3, respectively. This approach can be improved by assigning shorter code words to reference lines with a higher statistical probability of being selected. As many reference lines are signaled in a bitstream, the average code words length for reference line signaling is decreased when employing this mechanism. This results in increased coding efficiency. An example scheme for alternative reference line signaling with code words is discussed below.

Figure 13:
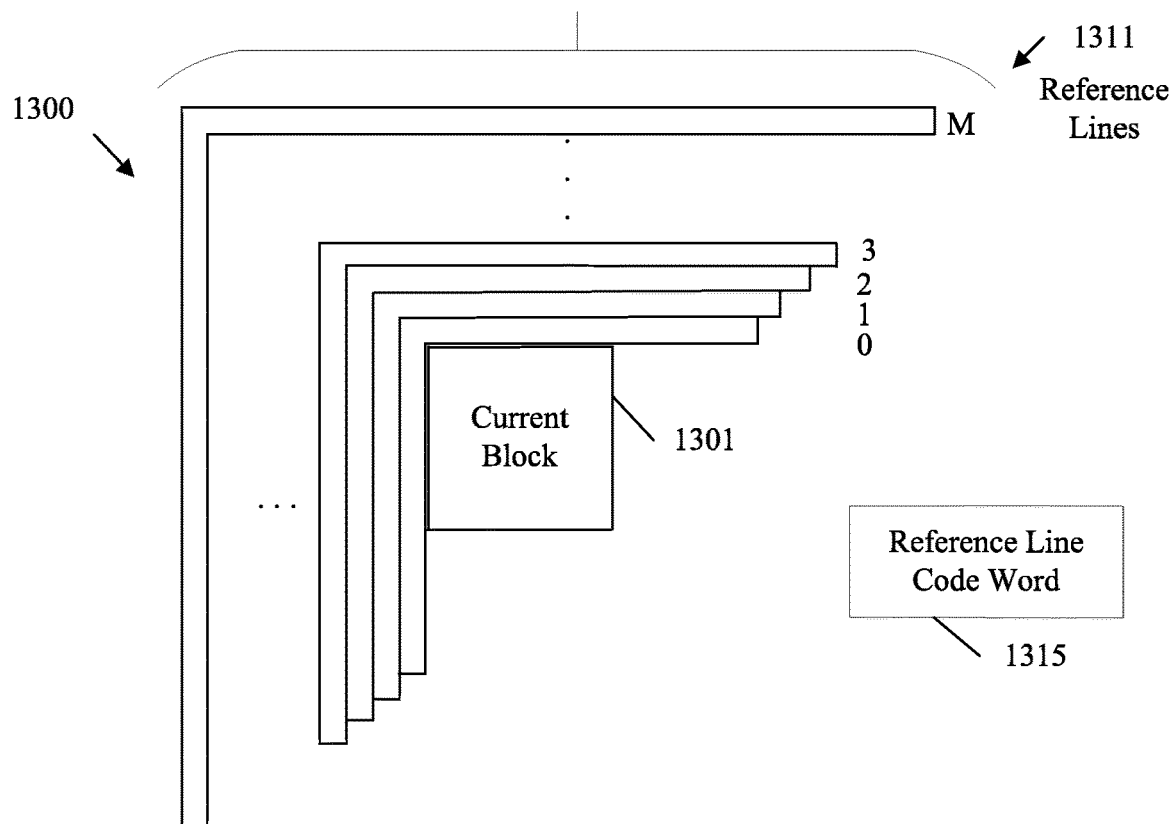
FIG. 13 is a schematic diagram illustrating an example mechanism for coding alternative reference lines with code words.

FIG. 13 is a schematic diagram illustrating an example mechanism 1300 for coding alternative reference lines with code words. The mechanism 1300 can be employed at an encoder or a decoder, such as encoder 300 or decoder 400, when performing intra-prediction, for example according to intra-prediction modes 500. The mechanism 1300 can be employed in conjunction with an intra-prediction mode subset 930, conditional signaling representations 1000 and 1100, DC mode intra-prediction 1200, or can be employed independently of such examples.

The mechanism 1300 employs a current block 1301 to be coded by intra-prediction and corresponding reference lines 1311 containing reference samples. The current block 1301 and reference lines 1311 may be substantially similar to current block 801 and reference lines 811, respectively. The current block 1301 is matched to one or more reference samples in the reference lines 1311. Based on the match, an intra-prediction mode and a reference line 1311 are selected to indicate the matching reference sample. The selected intra-prediction mode is coded in the bitstream as discussed above. Further, the index of the selected reference line can be coded in the bitstream by employing a reference line code word 1315. A reference line code word 1315 is a binary value that indicates an index of a reference line. Further, the reference line code word 1315 omits leading zero values to further compress data. Accordingly, a reference line 1311 can be signaled with a single binary value in some cases.

In mechanism 1300, the length of a code word 1315 for a reference line 1311 index may not be associated with the distance from the reference line 1311 to the current block 1301. Instead, the code words 1315 are assigned to the reference lines 1311 based on the length of the code word 1315 and the probability that a corresponding reference line 1311 is selected as the reference line 1311 to be employed for a current block 1301. In some cases, a reference line 1311 which is further away from the current block 1301 may be given a shorter code word than a reference line 1311 that is immediately adjacent to the current block 1301. For example, code words 1315 of 0, 10, 110, and 111 may be employed to indicate RefLine0, RefLine3, RefLine1 and RefLine2, respectively. In addition, the first bin or the first two bins of the code words 1315 may be context coded while the last bin(s) may be by-pass coded without context. The contexts may be derived from spatial (e.g., top and left) neighbor blocks. Table 5 shows example coding schemes for code words 1315 when four reference lines 1311 are employed.

TABLE 5

| Reference line Index | MLIP | Example 1 | Example 2 |
| --- | --- | --- | --- |
| 0 | 0 | 0 | 0 |
| 1 | 10 | 110 | 111 |
| 2 | 110 | 111 | 110 |
| 3 | 111 | 10 | 10 |

As shown in table 5, reference lines 1311 may be indexed as zero though three. In an example MLIP scheme, such indexes are represented by code words 1315 based on distance from the current block 1301, with the smallest code word assigned to the closest reference line 1311 and the largest code words 1315 assigned to the most distant reference line 1311. In example mechanisms one and two, the most probable reference line 1311 is index zero, which receives the shortest code word 1315. The second most probable reference line 1311 is the farthest reference line (index three), which receives the second shortest code word 1315. The remaining code words 1315 are assigned to indexes one and two in descending or ascending order, depending on the example.

In another example, the reference line 1311 of index zero may remain the most probable reference line 1311. Further, the second most probable reference line 1311 may be the reference line 1311 of index two. This would result in Table 6.

TABLE 6

| Reference line Index | MLIP | Example 1 | Example 2 |
| --- | --- | --- | --- |
| 0 | 0 | 0 | 0 |
| 1 | 10 | 110 | 111 |
| 2 | 110 | 10 | 10 |
| 3 | 111 | 111 | 110 |

As shown in Table 6, the most probable reference line 1311 is index zero, which receives the shortest code word 1315. The second most probable reference line 1311 is the second farthest reference line (index two), which receives the second shortest code word 1315. The remaining code words 1315 are assigned to indexes one and three in descending or ascending order, depending on the example.

The above examples can be extended to cases where larger numbers of reference lines are employed. For example, when five reference lines are employed, the examples of Table 5 could be expanded as shown in Table 7.

TABLE 7

| Reference line Index | MLIP | Example 1 | Example 2 |
| --- | --- | --- | --- |
| 0 | 0 | 0 | 0 |
| 1 | 10 | 110 | 11111 |
| 2 | 110 | 1110 | 11110 |
| 3 | 1110 | 10 | 10 |
| 4 | 11110 | 11110 | 1110 |
| 5 | 11111 | 11111 | 110 |

As shown in Table 7, the most probable reference line 1311 is index zero, which receives the shortest code word 1315. The second most probable reference line 1311 is the reference line 1311 associated with index two, which receives the second shortest code word 1315. The remaining code words 1315 are assigned to indexes one, two, four, and five in descending or ascending order, depending on the example.

In another example, the reference line 1311 indexes can be sorted into classes, and each class can be assigned different groups of code words 1315 that can be arranged differently. For example, a class A group may receive the shortest code words 1315 and a class B may receive the longest code words 1315. Class A code words 1315 and class B code words 1315 may be assigned in ascending or descending order, or any combination thereof. The class construction scheme may be predefined. The following example is provided to clarify this scheme. The following example employs six reference lines 1311 indexed from zero to five as shown in Table 8 below. The reference lines 1311 may be assigned to either class as desired. For example, reference lines 1311 indexed as one, three, and five may be assigned to class A, while the reference lines indexed as two and four may be assigned to class B. The reference line 1311 indexed as zero may always be the highest probability selection, and hence may always have the shortest code word 1315. Class A may be assigned the shortest code words 1315, other than the code word 1315 for index zero. Class B may then be assigned the longest code words 1315. The results of such a scheme are shown in Table 8.

TABLE 8

| Reference line Index | Class | Ex1(Inc + Inc) | Ex2(Inc + Dec) | Ex3(Dec + Inc) | Ex4(Dec + Dec) |
|---|---|---|---|---|---|
| 0 | 0 | 0 | 0 | 0 | 0 |
| 1 | A | 10 | 10 | 1110 | 1110 |
| 2 | B | 11110 | 11111 | 11110 | 11111 |
| 3 | A | 110 | 110 | 110 | 110 |
| 4 | B | 11111 | 11110 | 11111 | 11110 |
| 5 | A | 1110 | 1110 | 10 | 10 |

In a first example of Table 8, class A and class B code words 1315 both increment (descending order) independently. In a second example of Table 8, class A code words 1315 increment (descending order) while class B code words 1315 decrement (ascending order). In a third example of Table 8, class A code words 1315 decrement (ascending order) while class B code words 1315 increment (descending order). In a fourth example of Table 8, class A and class B code words 1315 both decrement (ascending order) independently. Any number of reference lines and any number of classes may be employed in this scheme to generate code words 1315 as desired.

Additional modifications can also be made to a MLIP scheme, independently or in combination with the examples/embodiments discussed above. For example, MLIP schemes employ alternative reference lines with both rows and columns. In many MLIP schemes, an identical number of rows and columns are employed. However, when the MLIP scheme is operated in hardware, the entire set of rows are stored in memory during coding, for example in a line buffer on a central processing unit (CPU) chip. Meanwhile, the columns may be stored in cache and pulled onto the CPU buffers as desired. Accordingly, employing reference line rows is more computationally expensive in terms of system resources than employing reference line columns. As reducing the line buffer memory usage may be desirable, the MLIP scheme below employs different numbers of reference rows and reference columns. Specifically, the MLIP scheme below employs fewer reference rows than reference columns.

Figure 14:
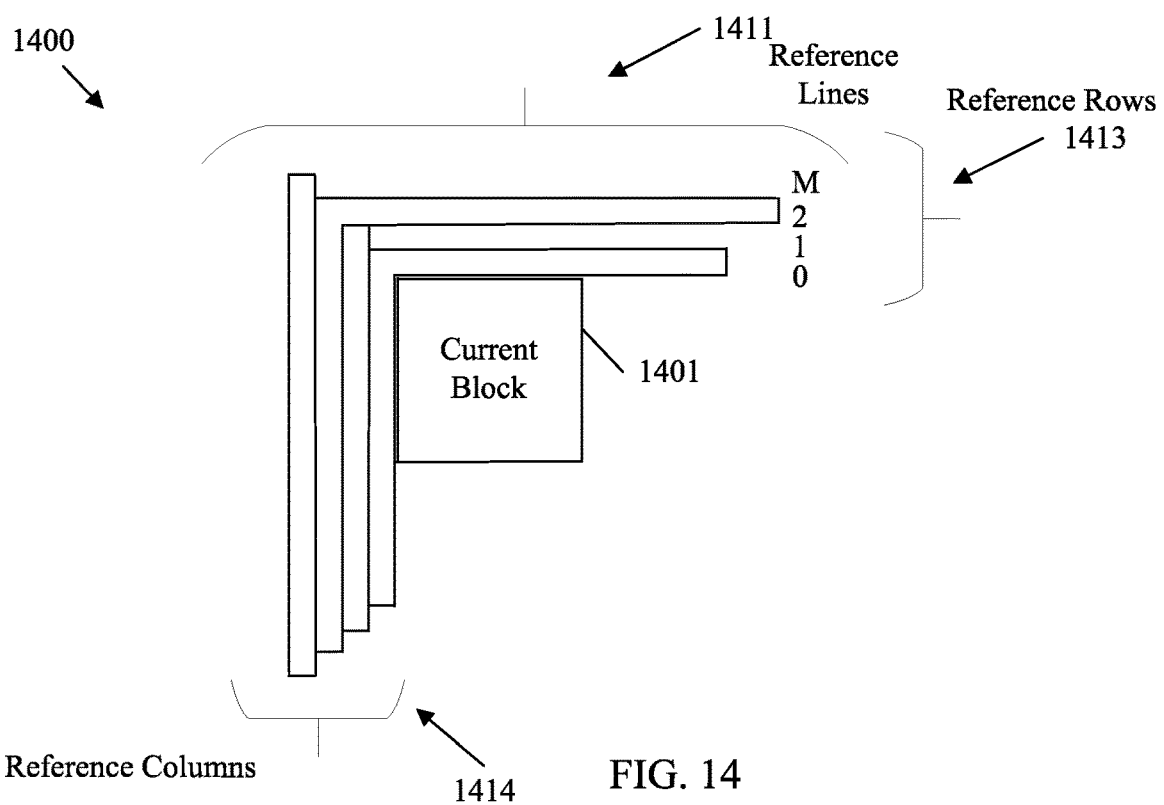
FIG. 14 is a schematic diagram illustrating an example mechanism for coding alternative reference lines with different numbers of rows and columns.

FIG. 14 is a schematic diagram illustrating an example mechanism 1400 for coding alternative reference lines with different numbers of rows and columns. The mechanism 1400 can be employed at an encoder or a decoder, such as encoder 300 or decoder 400, when performing DC intra-prediction, for example according to intra-prediction modes 500. The mechanism 1400 can be employed in conjunction with an intra-prediction mode subset 930, conditional signaling representations 1000 and 1100, DC mode intra-prediction 1200, mechanism 1300, or can be employed independently of such examples.

The mechanism 1400 employs a current block 1401 with alternative reference lines 1411 denoted as 0-M. As such, any number of reference lines 1411 may be employed. Such reference lines 1411 are substantially similar to reference lines 811 and/or 1211 and contain reference samples that are substantially similar to reference samples 812 and/or 1212. The reference lines 1411 include reference rows 1413 including reference samples positioned above the current block 1401. The reference lines 1411 also include reference columns 1414 including reference samples positioned to the left of the current block 1401. As noted above, MLIP schemes store all of the reference rows 1413 in on-chip memory during intra-prediction, which is resource intensive. Accordingly, to reduce the memory usage and/or to obtain a particular trade-off between coding efficiency and memory usage, the number of reference rows 1413 can be less than the number of reference columns 1414. As shown in FIG. 14, the number of reference rows 1413 can be half of the number of reference columns 1414. For example, this can be achieved by removing half of the reference rows 1413 between the first reference rows 1413 and the last reference row 1413 (e.g., keeping RefLine0 and RefLine3, but removing RefLine1 and RefLine2). In another example, odd rows 1413 or even rows 1413 can be removed (e.g., keeping RefLine0 and RefLine2, but removing RefLine1 and RefLine3 or vice versa). The mechanism 1400 for removing the rows 1413 can be predefined.

Figure 15:
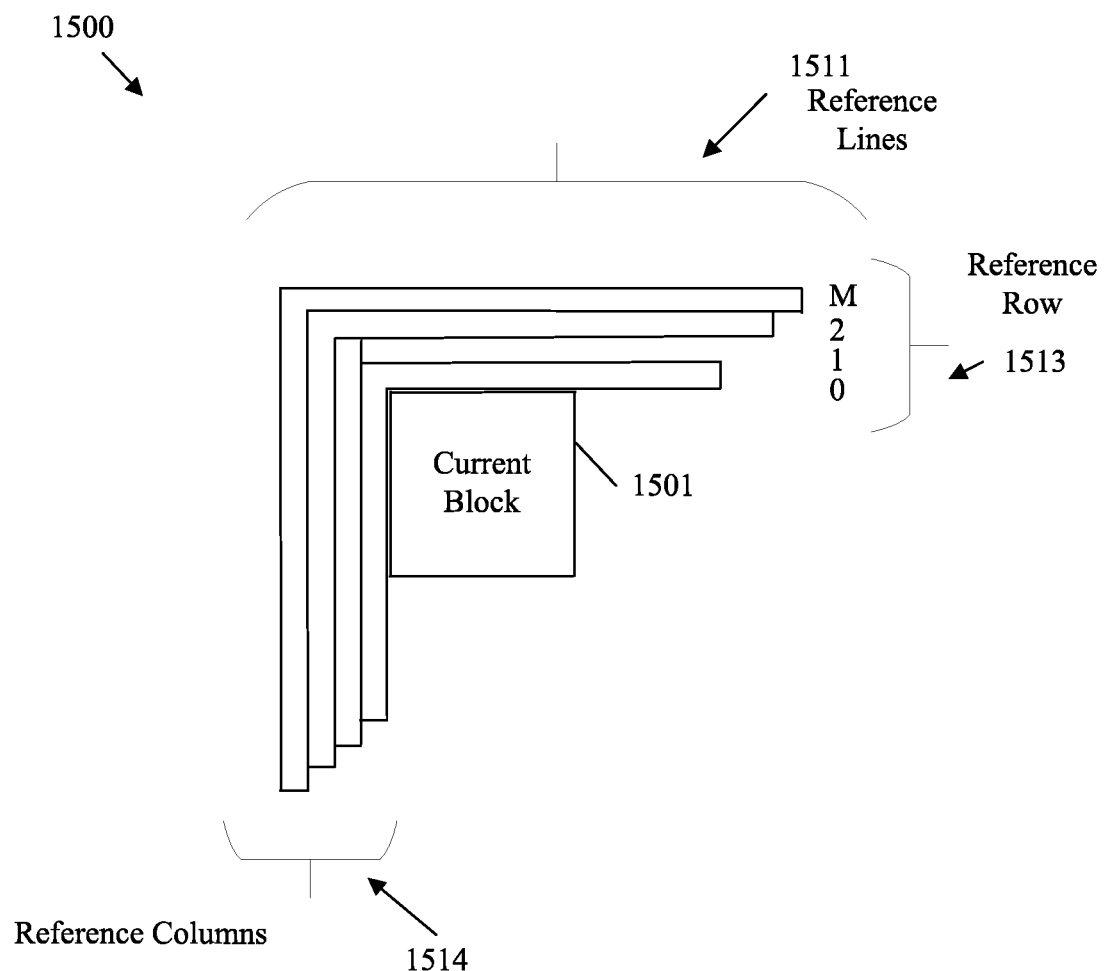
FIG. 15 is a schematic diagram illustrating another example mechanism for coding alternative reference lines with different numbers of rows and columns.

FIG. 15 is a schematic diagram illustrating another example mechanism 1500 for coding alternative reference lines with different numbers of rows and columns. The mechanism 1500 can be employed at an encoder or a decoder, such as encoder 300 or decoder 400, when performing DC intra-prediction, for example according to intra-prediction modes 500. The mechanism 1500 can be employed in conjunction with an intra-prediction mode subset 930, conditional signaling representations 1000 and 1100, DC mode intra-prediction 1200, mechanism 1300, or can be employed independently of such examples.

The mechanism 1500 is substantially similar to mechanism 1400, but employs different numbers of reference rows 1513. Specifically, mechanism 1500 employs a current block 1501 with alternative reference lines 1511 denoted as 0-M. As such, any number of reference lines 1511 may be employed. Such reference lines 1511 are substantially similar to reference lines 811 and/or 1211 and contain reference samples that are substantially similar to reference samples 812 and/or 1212. The reference lines 1511 include reference rows 1513 including reference samples positioned above the current block 1501. The reference lines 1511 also include reference columns 1514 including reference samples positioned to the left of the current block 1501.

In this case, the number of reference rows 1513 is the number of reference columns 1514 minus K, where K is a positive integer which is less than the number of reference columns 1514. K may be predefined or signaled in a Sequence Parameter Set (SPS), a Picture Parameter Set (PPS), or a slice header in the bitstream. In the example shown, the number of reference rows 1513 is the number of reference columns 1514 minus one. However, any value of K may be employed. A reference row 1513 is removed by employing any predefined mechanism. In FIG. 15, the reference row 1513 associated with the reference line 1511 indexed as one is removed. In other examples, the reference row 1513 associated with the reference line 1511 indexed as two, three, etc. is removed.

When employing mechanisms 1400 and/or 1500 the reference index of the reference rows may be different from the reference index of the reference columns. A few mechanisms are presented below to indicate or derive the reference line index when the numbers of reference rows and columns are different as discussed above. In one mechanism, the reference column index and the left row index are signaled separately. For example, one syntax element is used to signal the reference row index, between zero and NumTop, where NumTop is the number of reference rows (including 0 and NumTop). Another syntax element is used to signal the reference column index, between zero and NumLeft where NumLeft is the number of reference columns (including 0 and NumLeft.)

In another mechanism, one syntax element is used to signal the reference line index for both the reference row and the reference column. In most examples, NumLeft is greater than NumTop. However, the mechanisms described below also apply to the situation where NumTop is greater than NumLeft. When NumLeft>NumTop, in one mechanism, the index of reference columns is signaled using the mechanisms described above. In such a case, the reference line index is between zero and NumLeft (including zero and NumLeft). When a reference line or reference pixel from a reference row is employed and the reference line index is greater than NumTop, the reference line associated with the index of NumTop is signaled.

In another mechanism, when NumLeft>NumTop, the index of the reference row is signaled using the mechanisms described above. In such a case, the reference index is between zero and NumTop (including 0 and NumTop). When a reference line or pixel from a reference row is employed, the signaled (or parsed) reference line index indicates the selected reference line. Because NumLeft is greater than NumTop, an index mapping table is employed to map a signaled reference line index to a selected reference column when the reference sample from a reference column is selected. Example mapping tables 9-11 are illustrated as follows.

TABLE 9

| Signaled index | 0 | 1 | 2 | ... | NumTop |
|---|---|---|---|---|---|
| Actual index | 0 | 2 | 4 | ... | Min(NumTop*2, NumLeft) |

TABLE 10

| Signaled index | 0 | 1 | 2 | ... | NumTop |
|---|---|---|---|---|---|
| Actual index | 0 | 1 | 2 | ... | NumLeft |

TABLE 11

| Signaled index | 0 | 1 | 2 | 3 | ... | NumTop |
|---|---|---|---|---|---|---|
| Actual index | 0 | 1 | 3 | 5 | ... | NumLeft |

In some examples, the table mappings as shown above may be replaced by a calculation depending on the implementation.

Further, some intra-prediction modes employ reference columns as reference lines, while other intra-prediction modes use reference rows as reference lines. Meanwhile, some intra-prediction modes employ both the reference rows and the reference columns as reference lines. For example, the index range definition may be intra-prediction mode dependent. This is because the phase process and the phase results are decided by the index range.

As specific examples, the intra-prediction modes that employ the reference columns (e.g., [DirS, DirH]) have an index range of [0, NumLeft]. The intra-prediction modes that employ the reference rows (e.g., [DirV, DirE]) have an index range of [0, NumTop]. The intra-prediction modes that employ both reference columns and reference rows may have two cases. In a first case, the index range is between [0, NumTop] (denoted as Modi1). In this case NumLeft>NumTop, while the index range is [1, NumTop]. Therefore, a number of reference columns are selected from the NumLeft reference columns, where the number of selected reference columns is Numtop or less. The selection mechanism is predefined at the encoder and decoder. In a second case, the index range is between [0, NumLeft] (denoted as Modi2). In this case, a mapping mechanism is employed to determine the index of reference columns and the index reference rows, for example based on a signaled reference line index. The mapping mechanism is predefined. For example any mapping mechanism in Tables 9-11 above may be employed.

As another specific example, when the number of reference lines is four, the reference rows of reference lines RefLine1 and RefLine3 may be removed to reduce the on-chip memory usage. In this case, four reference columns and two reference rows are employed. When an intra-prediction mode employs both the reference columns and the reference rows, the index range is re-defined to uniquely signal the selected reference sample(s). In this case intra-prediction modes [DirS, DirH] have an index range of [0, 3]. For intra-prediction modes [DirV, DirE], the index range is [0,1].

For intra-prediction modes employing both reference columns and reference rows (e.g., Planar, DC, or intra-prediction modes in (DirH, DirV)), the index range is [0,1] (Modi1) or the index range is [0,3] (Modi2). When the index range is [0,1] (denoted as Modi1) two of the reference columns are employed (e.g., the left part of RefLine0 and RefLine2 are employed). In this case, the number of both reference rows and reference columns is two. The remaining two reference columns may also be selected to be employed (e.g., RefLine1 and RefLine3). The selection mechanism is predefined. When the index range is [0,3] (denoted as Modi2) the number of reference columns is four, the number of reference rows is two, and the index range is [0, 3]. A index mapping mechanism is then employed (e.g., reference column index in [0,1] correspond to reference row index zero, reference column index in [2,3] correspond to reference row index 1). Other mapping mechanisms can also can be used (e.g., column index in [0, 2] corresponds to row index 0, column index 3 corresponds to row index 1, and so on). However, the mapping mechanism employed is predefined.

The reference index coding mechanisms and the reference line construction mechanisms can be combined to improve the coding efficiency and reduce the on-chip memory usage. Below is an example combination of such mechanisms. In this case, the index of farthest reference line is assigned the shortest code word and NumTop is half of NumLeft. Further, the number of reference lines is four and Ex1 from Table 8 is employed. As for the index coding mechanism, when NumTop is less than NumLeft, Modi1 is used, in which, the columns of RefLine0 and RefLine3 are retained. This results in a reference line signaling mechanism as shown in Table 12 below.

TABLE 12

| Reference line Index | Ex1 |
|---|---|
| 0 | 0 |
| 1 | 110 |

TABLE 12-continued

| Reference line Index | Ex1 |
|---|---|
| 2 | 111 |
| 3 | 10 |

In this example when the intra-prediction mode is between [DirS, DirH], the index range is [0, 3], and the mechanism of representing the reference line index is shown in table 12. The reference column can be selected as the reference line, according to the reference line index. Further, when the intra-prediction mode is between [DirV, DirE], the index range is [0, 1], and the mechanism of representing the reference line index is defined in table 12. The reference row can be selected as the reference line according to the reference line index. In this case RefLine0 and RefLine3 are taken into account, while RefLine1 and RefLine2 are not taken into account. If the intra-prediction mode is between [Planar, DC] and (DirH, DirV), the index range is [0, 1], and the mechanism of representing the reference line index is defined in Table 12. The reference column and the reference rows are then selected as the reference line according to the reference line index. In this case, RefLine0 and RefLine3 are taken into account, while RefLine1 and RefLine2 are not be taken into account. Similarly, the binarization tables discussed above may also be applied to further increase coding efficiency.

Figure 16:
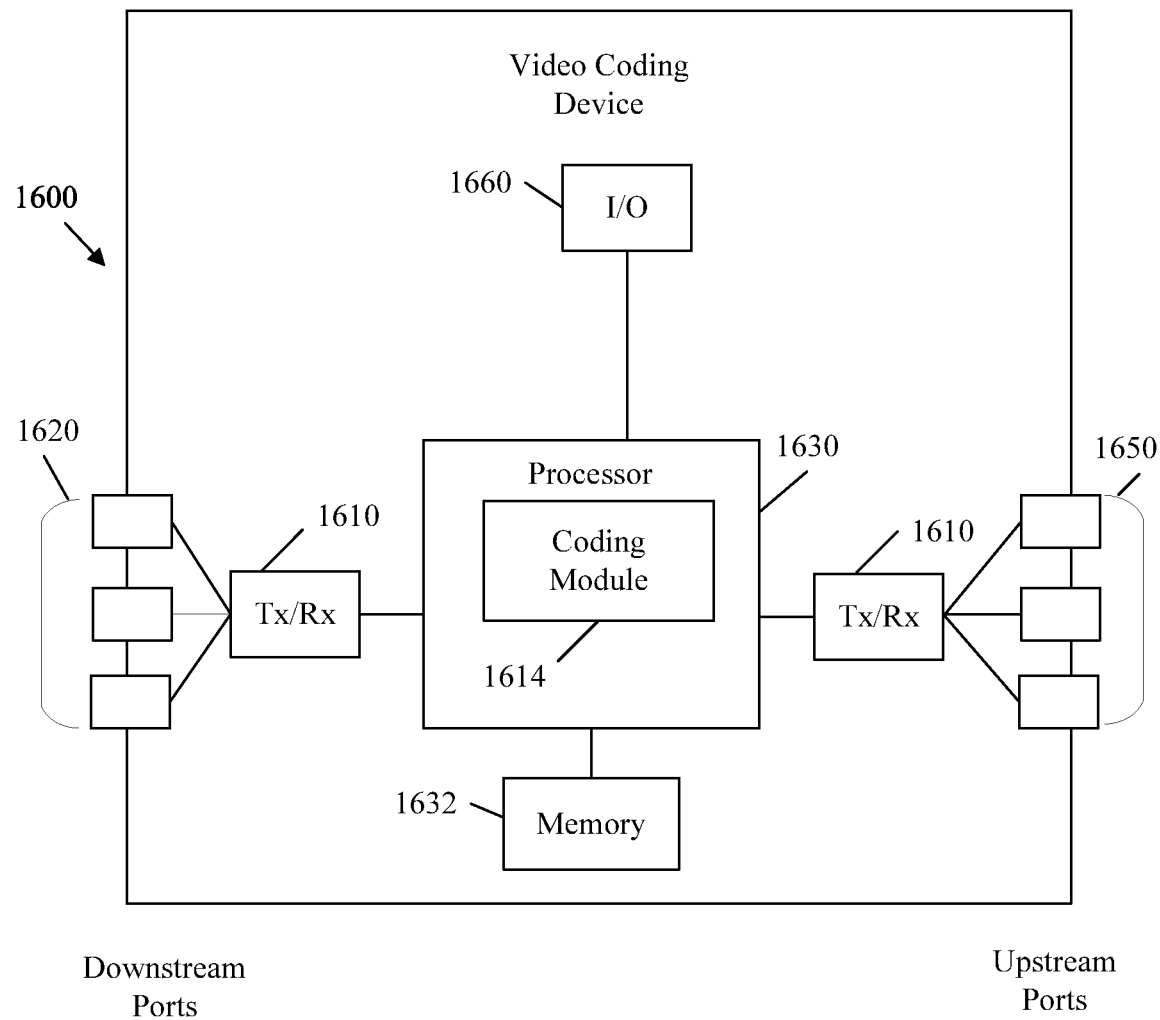
FIG. 16 is a schematic diagram of an example video coding device.

FIG. 16 is a schematic diagram of a video coding device 1600 according to an embodiment of the disclosure. The video coding device 1600 is suitable for implementing the disclosed embodiments as described herein. The video coding device 1600 comprises downstream ports 1620, upstream ports 1650, and/or transceiver units (Tx/Rx) 1610 for communicating data upstream and/or downstream over a network. The video coding device 1600 also includes a processor 1630 including a logic unit and/or central processing unit (CPU) to process the data and a memory 1632 for storing the data. The video coding device 1600 may also comprise optical-to-electrical (OE) components, electrical-to-optical (EO) components, and/or wireless communication components coupled to the upstream ports 1650 and/or downstream ports 1620 for communication of data via optical or wireless communication networks. The video coding device 1600 may also include input and/or output (I/O) devices 1660 for communicating data to and from a user. The I/O devices 1660 may include output devices such as a display for displaying video data, speakers for outputting audio data, etc. The I/O devices 1660 may also include input devices, such as a keyboard, mouse, trackball, etc. and/or corresponding interfaces for interacting with such output devices.

The processor 1630 is implemented by hardware and software. The processor 1630 may be implemented as one or more CPU chips, cores (e.g., as a multi-core processor), field-programmable gate arrays (FPGAs), application specific integrated circuits (ASICs), and digital signal processors (DSPs). The processor 1630 is in communication with the downstream ports 1620, Tx/Rx 1610 upstream ports 1650, and memory 1632. The processor 1630 comprises a coding module 1614. The coding module 1614 implements the disclosed embodiments described above, such as methods 1700, 1800, 1900 and/or any other mechanisms described above. Further, the coding module 1614 may implement a codec system 200, an encoder 300, decoder 400, perform intra-prediction with intra-prediction modes 500 with blocks 600, employ a primary reference line scheme 700, employ an alternative reference line scheme 800, employ an intra-prediction mode subset 930, employ representations 1000 and/or 1100, employ DC mode intra-prediction 1200, employ mechanisms 1300, 1400, and/or 1500, as well as any combination thereof. The inclusion of the coding module 1614 therefore provides a substantial improvement to the functionality of the video coding device 1600 and effects a transformation of the video coding device 1600 to a different state. Alternatively, the coding module 1614 can be implemented as instructions stored in the memory 1632 and executed by the processor 1630 (e.g., as a computer program product stored on a non-transitory medium).

The memory 1632 comprises one or more memory types such as disks, tape drives, solid-state drives, read only memory (ROM), random access memory (RAM), flash memory, ternary content-addressable memory (TCAM), static random-access memory (SRAM), etc. The memory 1632 may be used as an over-flow data storage device, to store programs when such programs are selected for execution, and to store instructions and data that are read during program execution.

Figure 17:
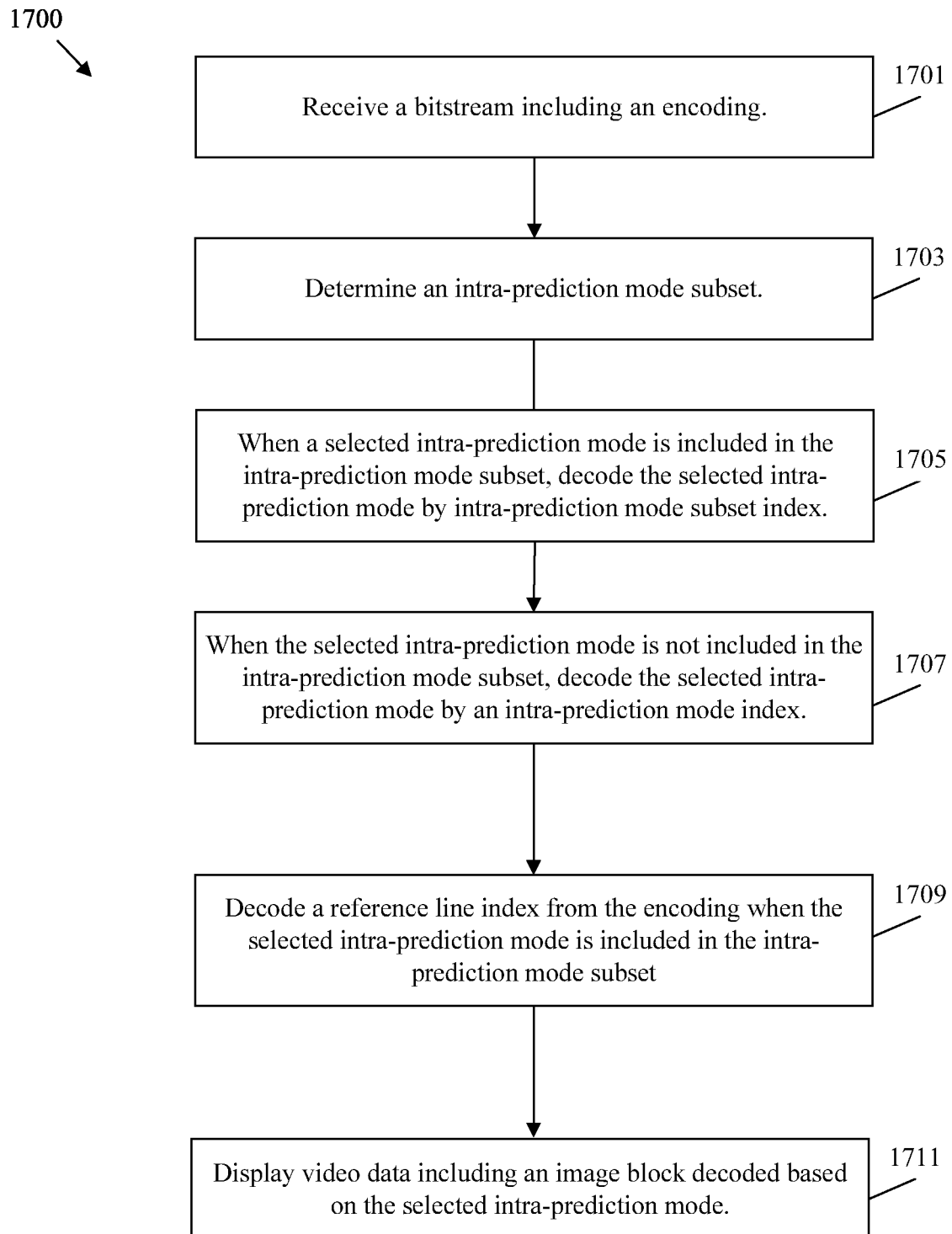
FIG. 17 is a flowchart of an example method of video coding with an intra-prediction mode subset with alternative reference lines.

FIG. 17 is a flowchart of an example method 1700 of video coding with an intra-prediction mode subset with alternative reference lines. For example, method 1700 may operate on a video coding device 1600 configured to act as a decoder 400. Method 1700 may also employ intra-prediction modes 500 in conjunction with alternative reference line scheme 800 and intra-prediction mode subset 930.

At step 1701, a bitstream is received. The bitstream includes an encoding of compressed video data as compressed by a decoder. At step 1703, an intra-prediction mode subset, such as intra-prediction mode subset 930, is determined. The intra-prediction mode subset includes intra-prediction modes that correlate to a plurality of reference lines for a current image block and excludes intra-prediction modes that correlate to a primary reference line for the current image block. The intra-prediction mode subset may include various groups of intra-prediction modes as discussed above. In some examples, the intra-prediction mode subset includes DirS, DirE, and every Nth directional intra-prediction mode between DirS and DirE, where N is a predetermined integer value. In other examples, the intra-prediction mode subset may further include planar prediction mode and DC prediction mode. In a further example, the intra-prediction mode subset includes DirS, DirE, DirD, DirH, DirV, and valid directional intra-prediction modes at directions of plus or minus N of DirS, DirE, DirD, DirH, and DirV, where N is a predetermined integer value. Such an intra-prediction mode subset may further include planar prediction mode and DC prediction mode. In yet another example, the intra-prediction mode subset includes intra-prediction modes selected for decoded neighbor blocks positioned at a predetermined adjacency to the current image block. In yet another example, the intra-prediction mode subset includes modes associated with an MPM list for the block. Further, the intra-prediction mode subset may include any other combination of intra-prediction modes discussed hereinabove.

At optional step 1705, a selected intra-prediction mode is decoded by an intra-prediction mode subset index when the selected intra-prediction mode is included in the intra-prediction mode subset. At optional step 1707, the selected intra-prediction mode is decoded by an intra-prediction mode index when the selected intra-prediction mode is not included in the intra-prediction mode subset. The selected intra-prediction mode may also be decoded based on MPM index in some cases as discussed with respect to FIG. 9.

Flags may also be employed to provide context for determining the indexing scheme as discussed with respect to FIGS. 10-11.

At step 1709, a reference line index is decoded from the encoding when the selected intra-prediction mode is included in the intra-prediction mode subset. The reference line index indicates a selected reference line from the plurality of reference lines for the selected intra-prediction mode. As discussed above, no reference line index is decoded when the selected intra-prediction mode is not included in the intra-prediction mode subset in order to reduce extraneous bits in the bitstream. The reference line index may be coded after the selected intra-prediction mode in the encoding to further support such conditional signaling in the bitstream (e.g., as discussed with respect to FIGS. 10-11).

At step 1711, the video data is presented to a user via a display. The video data includes an image block decoded based on the selected intra-prediction mode and the corresponding reference line(s).

Figure 18:
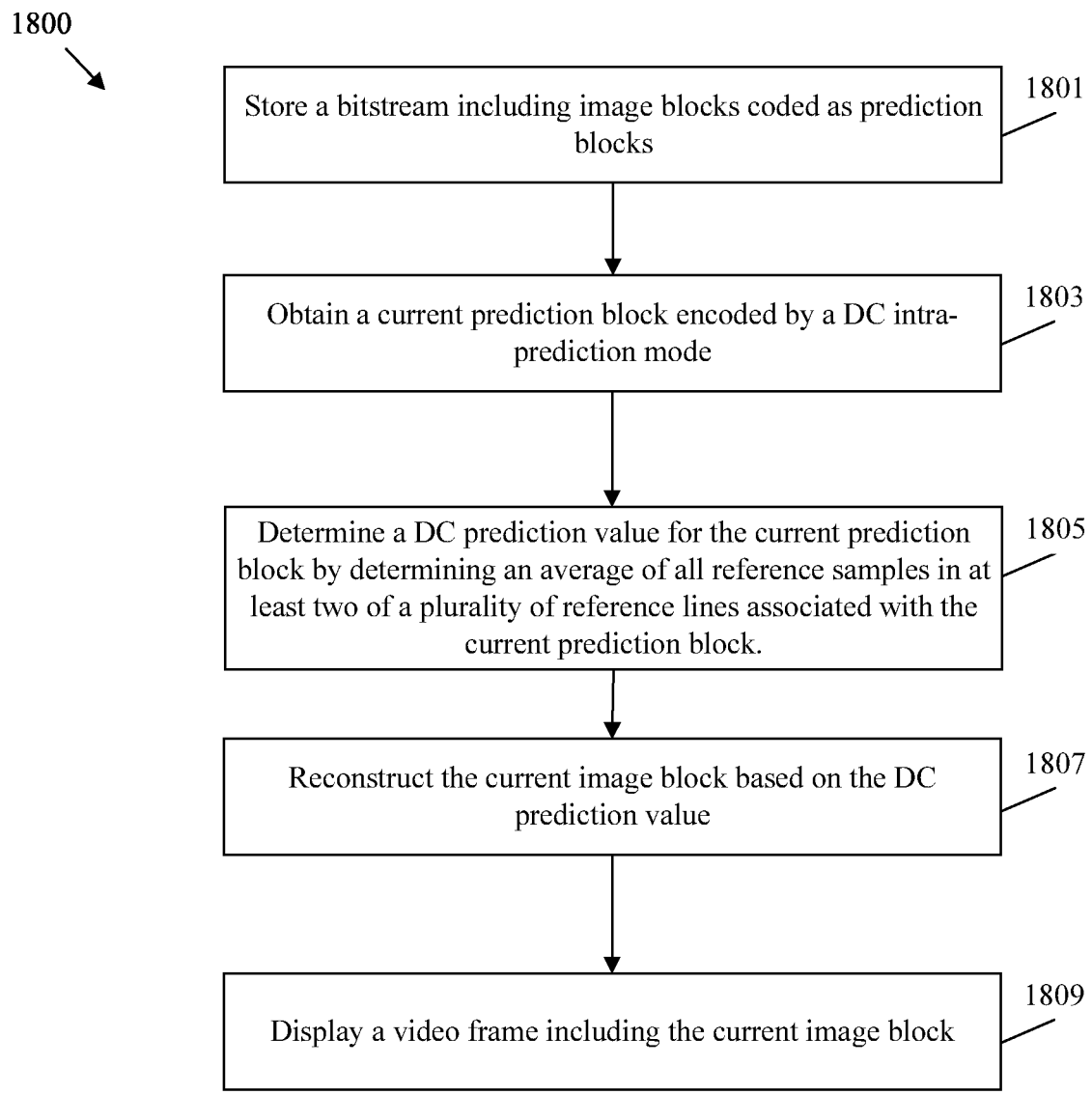
FIG. 18 is a flowchart of an example method of video coding with DC mode intra-prediction with alternative reference lines.

FIG. 18 is a flowchart of an example method 1800 of video coding with DC mode intra-prediction with alternative reference lines. For example, method 1800 may operate on a video coding device 1600 configured to act as a decoder 400. Method 1800 may also employ intra-prediction modes 500 in conjunction with alternative reference line scheme 800 and intra-prediction mode subset 930 according to DC mode intra-prediction 1200.

At step 1801, a bitstream is stored in memory. The bitstream includes compressed video data. The compressed video data includes image blocks coded as prediction blocks according to an intra-prediction scheme. At step 1803 a current prediction block is obtained that is encoded by a DC intra-prediction mode. At step 1805, a DC prediction value is determined for the current prediction block. The DC prediction value approximates a current image block corresponding to the current prediction block by determining an average of all reference samples in at least two of a plurality of reference lines associated with the current prediction block. Accordingly, step 1805 extends the DC prediction mode into an alternative reference line context. In some examples, determining the DC prediction value may include determining an average of all reference samples in N adjacent reference lines to the current prediction block, where N is a predetermined integer. In some examples, determining the DC prediction value includes determining an average of all reference samples in a selected reference line and a corresponding (e.g., predefined) reference line. In yet another example, determining the DC prediction value includes determining an average of all reference samples in an adjacent reference line (e.g., reference line with index zero) and a selected reference line as signaled in a bitstream. Further, the DC prediction value may be determined by employing any combination of schemes as discussed with respect to FIG. 12 above. At step 1807, the current image block is reconstructed based on the DC prediction value. At block 1809, a video frame is including the current image block is displayed to a user.

Figure 19:
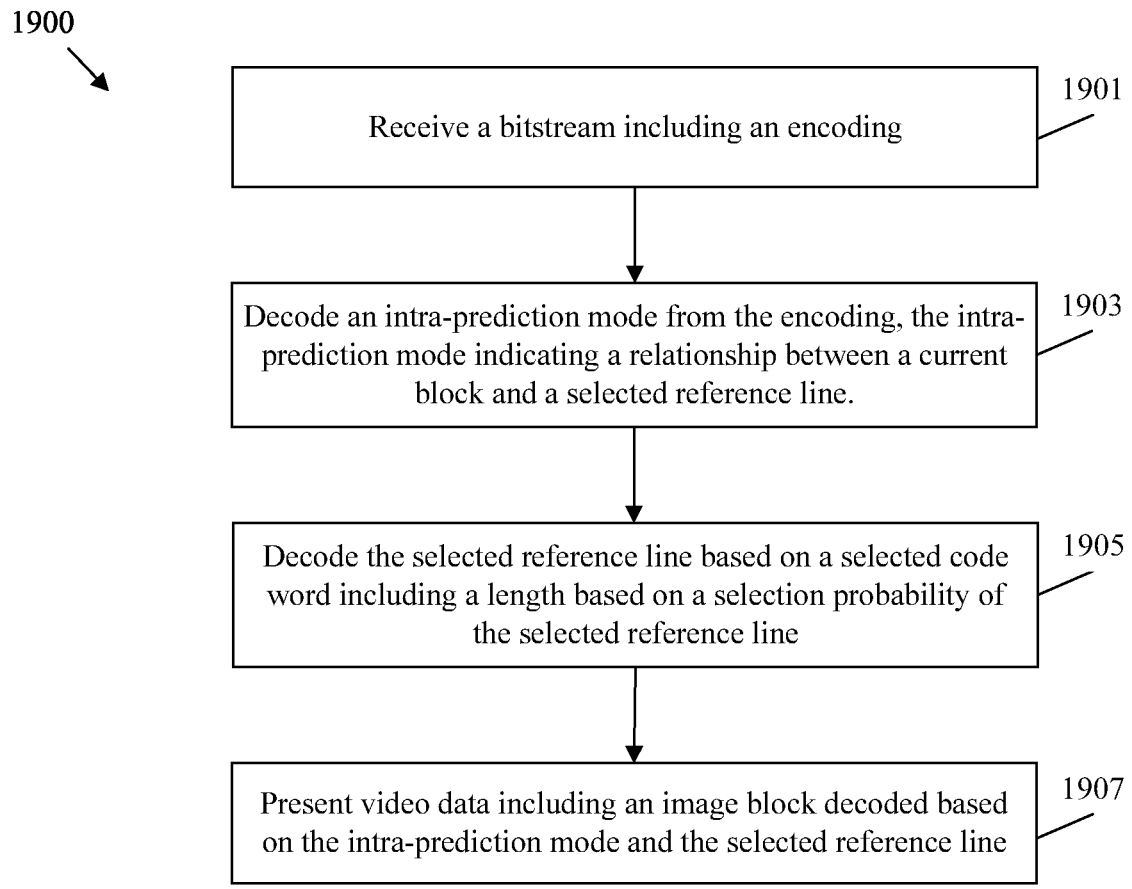
FIG. 19 is a flowchart of an example method of video coding with reference lines coded by code words based on selection probability.

FIG. 19 is a flowchart of an example method 1900 of video coding with reference lines coded by code words based on selection probability. For example, method 1900 may operate on a video coding device 1600 configured to act as a decoder 400. Method 1900 may also employ intra-prediction modes 500 in conjunction with alternative reference line scheme 800 and intra-prediction mode subset 930 by employing mechanism 1300. Further, different numbers of reference rows and reference columns may be employed by method 1900 as discussed with respect to FIGS. 14 and 15.

At step 1901, a bitstream is received that includes an encoding. The encoding included video data compressed by an encoder. At step 1903, an intra-prediction mode is decoded from the encoding. The intra-prediction mode indicates a relationship between a current block and a reference sample in a selected reference line. Further, the current block is associated with a plurality of reference lines including the selected reference line (e.g., an alternative reference line scheme). At step 1905, the selected reference line is decoded based on a selected code word indicating the selected reference line. The selected code word includes a length based on a selection probability of the selected reference line as discussed with respect to FIG. 13. For example, the plurality of reference lines may be indicated by a plurality of code words. Further, the reference line farthest from the current block may be indicated by the code word with a second shortest length. In another example, the reference line second farthest from the current block may be indicated by the code word with a second shortest length. In another example, a predefined reference line other than an adjacent reference line may be indicated by the code word with a second shortest length. In yet another example, the plurality of code words may be sorted into a class A group and a class B group. The class A group may include code words with shorter lengths than lengths of the code words in the class B group. Further, the class A group and the class B group can increment and decrement independently of each other. In further examples, the reference lines may include different numbers of reference rows and reference columns as discussed with respect to FIGS. 14 and 15. For example, the plurality of reference lines may include reference rows and reference columns. Further, the number of reference rows stored for the current block may be half the number of reference columns stored for the current block. In another example, the number of reference rows stored for the current block may be equal to a number of reference columns stored for the current block minus one. In another example, the number of reference rows stored for the current block may be selected based on the number of reference rows employed by a deblocking filter operation. At step 1907, video data is presented to a user via a display. The video data includes an image block decoded based on the intra-prediction mode and the selected reference line. Accordingly, methods 1700, 1800, and 1900 may be applied alone or in any combination to improve the effectiveness of a alternative reference line scheme when coding video via intra-prediction.

A video coding device comprising: a receiving means to receive a bitstream; a processing means to: determine an intra-prediction mode subset, the intra-prediction mode subset including intra-prediction modes that correlate to a plurality of reference lines for a current image block and excluding intra-prediction modes that correlate to a primary reference line for the current image block; when a first intra-prediction mode is included in the intra-prediction mode subset, decode the first intra-prediction mode by an alternative intra-prediction mode index; and when the first intra-prediction mode is not included in the intra-prediction mode subset, decode the first intra-prediction mode by an intra-prediction mode index; and a display means to present video data including an image block decoded based on the first intra-prediction mode.

A method comprising: storing, in a memory means, a bitstream including image blocks coded as prediction blocks; obtaining, by a processing means, a current prediction block encoded by a Direct Current (DC) intra-prediction mode; determining a DC prediction value to approximate a current image block corresponding to the current prediction block by determining an average of all reference samples in at least two of a plurality of reference lines associated with the current prediction block; reconstructing, by the processor, the current image block based on the DC prediction value; and displaying, on a display means, a video frame including the current image block.

A video coding device comprising: receiving means to receive a bitstream; a processing means to decode an intra-prediction mode from the bitstream, the intra-prediction mode indicating a relationship between a current block and a selected reference line, the current block associated with a plurality of reference lines including the selected reference line, and decode the selected reference line based on a selected code word indicating the selected reference line, the selected code word including a length based on a selection probability of the selected reference line; and a display means to present video data including an image block decoded based on the intra-prediction mode and the selected reference line.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A video coding device comprising:
a receiver configured to receive a bitstream;
a processor coupled to the receiver and configured to:
determine a value of a reference line index of a coding unit;
determine an intra-prediction mode from a list of most probable modes when a value of the reference line index indicates an additional reference line; and
decode the coding unit based on the intra-prediction mode.

2. The video coding device of claim 1, wherein the processor is further configured to determine an intra-prediction mode from a group of modes that excludes a list of most probable modes when the value of the reference line index indicates a primary reference line.

3. The video coding device of claim 2, wherein the list of most probable modes are signaled by a most probable mode index when the value of the reference line index indicates an additional reference line.

4. The video coding device of claim 2, wherein the group of modes that excludes the list of most probable modes are indexed by an intra-prediction mode index.

5. The video coding device of claim 2, wherein the list of most probable modes includes intra-prediction modes used by neighbor coding units.

6. The video coding device of claim 1, wherein the value of the reference line index is inferred to be equal to zero when not present.

7. A non-transitory computer readable medium comprising a computer program product for use by a video coding device, the computer program product comprising computer executable instructions stored on the non-transitory computer readable medium such that when executed by a processor cause the video coding device to:
receive a bitstream;
determine a value of a reference line index of a coding unit;
determine an intra-prediction mode from a list of most probable modes when a value of the reference line index indicates an additional reference line; and
decode the coding unit based on the intra-prediction mode.

8. The video coding device of claim 7, wherein the processor is further configured to determine an intra-prediction mode from a group of modes that excludes a list of most probable modes when the value of the reference line index indicates a primary reference line.

9. The video coding device of claim 8, wherein the list of most probable modes are signaled by a most probable mode index when the value of the reference line index indicates an additional reference line.

10. The video coding device of claim 8, wherein the group of modes that excludes the list of most probable modes are indexed by an intra-prediction mode index.

11. The video coding device of claim 8, wherein the list of most probable modes includes intra-prediction modes used by neighbor coding units.

12. The video coding device of claim 7, wherein the value of the reference line index is inferred to be equal to zero when not present.

13. A video coding device comprising:
a processor configured to:
determine a value of a reference line index of a coding unit;
determine an intra-prediction mode from a list of most probable modes when a value of the reference line index indicates an additional reference line;
encode the coding unit into a bitstream based on the intra-prediction mode; and
a memory coupled to the processor and configured to store the bitstream.

14. The video coding device of claim 13, wherein the processor is further configured to determine an intra-prediction mode from a group of modes that excludes a list of most probable modes when the value of the reference line index indicates a primary reference line.

15. The video coding device of claim 14, wherein the list of most probable modes are signaled by a most probable mode index when the value of the reference line index indicates an additional reference line.

16. The video coding device of claim 14, wherein the group of modes that excludes the list of most probable modes are indexed by an intra-prediction mode index.

17. The video coding device of claim 14, wherein the list of most probable modes includes intra-prediction modes used by neighbor coding units.

18. The video coding device of claim 13, wherein the value of the reference line index is omitted from the bitstream when the value of the reference line index is equal to zero.

* * * * *

UNITED STATES PATENT AND TRADEMARK OFFICE
CERTIFICATE OF CORRECTION

PATENT NO. : 11,184,610 B2  
APPLICATION NO. : 16/913227  
DATED : November 23, 2021  
INVENTOR(S) : Shan Liu et al.

Page 1 of 1

It is certified that error appears in the above-identified patent and that said Letters Patent is hereby corrected as shown below:

On the Title Page

Page 2, Column 2, Other Publications:

Delete "Shang, Y., et al., "Suggested Software for Multiple Reference Tiers in EE6," JVET-D0131, Oct. 15-21, 2016, 3 pages." and insert -- Chang, Y., et al., "Suggested Software for Multiple Reference Tiers in EE6," JVET-D0131, Oct. 15-21, 2016, 3 pages. --

Delete "Shang, Y., et al., "Suggested Software for Multiple Reference Tiers in EE6," JVET-D0131r1, Oct. 15-21, 2016, 4 pages." and insert -- Chang, Y., et al., "Suggested Software for Multiple Reference Tiers in EE6," JVET-D0131r1, Oct. 15-21, 2016, 4 pages. --

Delete "Li, J., et al., "Multiple line-based intra prediction," Joint Video Exploration Team (JVET) of ITU-T SG 16 WP 3 and ISO/EC JTC 1/SC 29/WG11, 3rd Meeting: Geneva, CH, May 26 - June 1, 2016, JVET-C0071 (version 2), 6 pages." and insert -- Li, J., et al., "Multiple line-based intra prediction," Joint Video Exploration Team (JVET) of ITU-T SG 16 WP 3 and ISO/IEC JTC 1/SC 29/WG11, 3rd Meeting: Geneva, CH, May 26 - June 1, 2016, JVET-C0071 (version 2), 6 pages. --

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*